US009348879B2

(12) United States Patent
Mohammad et al.

(10) Patent No.: US 9,348,879 B2
(45) Date of Patent: May 24, 2016

(54) DATA LINEAGE TRANSFORMATION ANALYSIS

(71) Applicant: Bank of America Corporation, Charlotte, NC (US)

(72) Inventors: Asim S. Mohammad, Union City, CA (US); Michelle A. Boston, Richardson, TX (US); Ilya Lapsker, Kew Gardens, NY (US)

(73) Assignee: Bank of America Corporation, Charlotte, NC (US)

( * ) Notice: Subject to any disclaimer, the term of this patent is extended or adjusted under 35 U.S.C. 154(b) by 126 days.

(21) Appl. No.: 14/028,439

(22) Filed: Sep. 16, 2013

(65) Prior Publication Data

US 2015/0012478 A1    Jan. 8, 2015

Related U.S. Application Data

(60) Provisional application No. 61/842,336, filed on Jul. 2, 2013.

(51) Int. Cl.
| | |
|---|---|
| *G06F 7/00* | (2006.01) |
| *G06F 17/00* | (2006.01) |
| *G06F 17/30* | (2006.01) |
| *G06Q 10/06* | (2012.01) |
| *G06F 21/00* | (2013.01) |

(52) U.S. Cl.
CPC .......... *G06F 17/30563* (2013.01); *G06F 21/00* (2013.01); *G06Q 10/063* (2013.01)

(58) Field of Classification Search
CPC ............ G06F 17/30563; G06T 11/203; G06T 11/206; G06T 15/40; G06T 15/405
USPC .......................................................... 707/602
See application file for complete search history.

(56) References Cited

U.S. PATENT DOCUMENTS

| | | | |
|---|---|---|---|
| 6,434,558 | B1 | 8/2002 | MacLeod et al. |
| 7,493,570 | B2 | 2/2009 | Bobbin et al. |
| 8,510,836 | B1 * | 8/2013 | Nachenberg .................... 726/23 |
| 2009/0063534 | A1 | 3/2009 | Halberstadt |
| 2009/0157593 | A1 * | 6/2009 | Hayashi ................. G06Q 10/10 |

(Continued)

OTHER PUBLICATIONS

Gorelik, Alex, "Data Lineage: What You Don't Know Can Hurt You," Information Management, Jul. 1, 2007, New York, New York.

*Primary Examiner* — Hosain Alam
*Assistant Examiner* — Nicholas Allen
(74) *Attorney, Agent, or Firm* — Weiss & Arons LLP; Michael A. Springs, Esq.

(57) ABSTRACT

Resources for data lineage discovery, data lineage analysis, role-based security, notification. The resources may include or involve machine readable memory that is configured to store a technical data element ("TDE"); a receiver that is configured to receive a query for data lineage information corresponding to a business element identifier; and a processor configured to: register a logical association between the business element identifier and the TDE; and formulate the data lineage information of the TDE associated with the business element identifier. The receiver may be configured to receive a criterion that is required to access one or more technical data elements ("TDEs") associated with the business element identifier. The receiver may be configured to receive an election to receive a notification of a change of data lineage. The processor may be configured to toggle between a first data lineage graph and a second data lineage graph.

18 Claims, 23 Drawing Sheets

(56) References Cited

U.S. PATENT DOCUMENTS

| | | | |
|---|---|---|---|
| 2009/0216728 A1* | 8/2009 | Brainerd et al. | 707/3 |
| 2009/0327120 A1* | 12/2009 | Eze | G06Q 40/025 705/38 |
| 2011/0078166 A1* | 3/2011 | Oliver | G06F 17/30864 707/760 |
| 2011/0320460 A1* | 12/2011 | Fankhauser et al. | 707/748 |
| 2012/0144284 A1* | 6/2012 | Le Brazidec et al. | 715/219 |
| 2012/0179990 A1* | 7/2012 | Curbera et al. | 715/771 |
| 2012/0310875 A1* | 12/2012 | Prahlad et al. | 707/602 |
| 2013/0144878 A1* | 6/2013 | James et al. | 707/736 |
| 2013/0151557 A1* | 6/2013 | Shanken et al. | 707/769 |
| 2015/0012478 A1* | 1/2015 | Mohammad et al. | 707/602 |

* cited by examiner

| KDE ID | SERVER | DATABASE/LOCATION | SCHEMA | TABLE/FILE | COLUMN/FIELD | ACTION |
|---|---|---|---|---|---|---|
| 1 | XXXXXA | DB_123N | SCH_800 | TBL_XX29 | 5620 | ** |
| 2 | XXXXXB | DB_123O | SCH_217 | TBL_XX47 | 0023 | ** |
| 3 | XXXXXC | DB_123P | SCH_446 | TBL_XX76 | 3401 | ** |
| 4 | XXXXXD | DB_123Q | SCH_938 | TBL_XX31 | 3001 | ** |
| ... | | | | | | ... |
| 25,434,199 | ZZZZZZ | DB_123A | SCH830 | TBL_XX93 | 0098 | ** |

| CROSS REFERENCE | |
|---|---|
| ATTRIBUTE | VALUE |
| KDE ID | 3 |
| KEY BUSINESS ELEMENT NAME | AGE (IN MONTHS) OF OLDEST TRADE |
| BUSINESS DESCRIPTION | THE AGE, IN MONTHS, OF OLDEST TRADE |
| SECURITY CLASSIFICATION | HIGH |
| CREATION DATE | 01/01/99 |
| LAST UPDATED BY | ASSOCIATE 999 |

FIG. 5

Business Element Detail — 802

| Business Element ID# — 806 | KBE? — 808 | KBE ID# (if applicable) — 814 | SOR — 818 | LOB — 826 | Designate as KBE? — 834 | | |
|---|---|---|---|---|---|---|---|
| 342 | YES — 810 | | DATABASE C — 820 | MORTGAGES — 828 | ● Yes ○ No — 836 | View Access Criteria — 840 | View Notification Options — 842 | Edit |
| 421 | NO — 812 | 203 — 816 | BECUBIC REPOSITORY — 822 | CREDIT CARD — 830 | ○ Yes ● No — 838 | View Access Criteria | View Notification Options | Edit |
| 273 | NO | | DMR — 824 | CONSUMER BANKING — 832 | ○ Yes ● No | View Access Criteria | View Notification Options | Edit — 844 |

Notification Center

1700 →

1702 Set New Notification ▼

1704 Edit Notification ▼

1706 View All Notifications ▼

1708 Current Notification Settings

| Business Element Identifier | Administrator/ Manager | Receive Notifications | Frequency | Notification Type | Source of Lineage Information Change | | |
|---|---|---|---|---|---|---|---|
| 3462 | Bob Smith | Yes☑ No☐ | Daily | Change of SOR | User 1 | Customize | Edit |
| 210 | John Jones | Yes☐ No☐ | Instantly | All Lineage Changes | All Users | Customize | Edit |
| 567 | Steve Brown | Yes☐ No☐ | Weekly | Designation of TDE to KDE | Users in Group B | Customize | Edit |
| 932 | Bob Smith | Yes☐ No☐ | Hourly | Change Originates from System 2 | Users with access level = Public | Customize | Edit |

DATA LINEAGE TRANSFORMATION ANALYSIS

CROSS-REFERENCE TO RELATED APPLICATION

This application is a non-provisional application of U.S. Provisional Application No. 61/842,336, filed Jul. 2, 2013, which is hereby incorporated by reference herein in its entirety.

FIELD OF TECHNOLOGY

This disclosure is related to analysis and utilization of data lineage. More particularly, the disclosure relates to tools for controlling business information based on corresponding data lineage information.

BACKGROUND

Stewardship of organizations typically requires organizational management to govern the flow of information. The flow may include acquisition, processing, storage, and distribution of the information, as well as other activities that involve the information. The stewardship may require that managers exercise control over the flow to satisfy goals of the organization. The control may include imposing constraints on the flow, viewing information in the flow, auditing the characteristics of the flow, or other measures. The goals may include financial, strategic, regulatory, risk management goals or other organizational goals. The goals are often set and understood by managers. The goals are often defined by or related to attributes of the information.

The information is often encoded, classified and manipulated by machines in an information system. The encoding may require the formulation and storage of digital data elements.

The flow of a data element in the information system may be characterized by data lineage. The data lineage is typically expressed in terms of the encoding, the machines and other technical attributes of the information system.

Typically, information technology specialists who are familiar with the information system are knowledgeable about data lineage, but are not knowledgeable about the goals. The managers are knowledgeable about the goals, but are not knowledgeable about the data lineage. Therefore, managers have a limited ability to control the flow.

It would be desirable, therefore, to provide apparatus and methods for controlling data flow using the parameters of the information.

SUMMARY OF THE INVENTION

Apparatus, methods, code and encoded media (individually or collectively, "the tool" or "the tools") for discovering and analyzing data in a complex machine information environment are provided. The complex information environment may be administered by an institution.

The environment may store and manipulate business information elements. The business information elements may represent a value, status, entity or any other suitable element that may play a role in business decisioning, strategy, planning or execution. Illustrative business information elements may include: social security number, income, location, age, occupation, credit rating, balance, account status, gender, family size, mortgage information, credit card information, customer-institution contact event, citizenship, customer behavior, corporate financial information, corporate finances, such as assets and debits, and other such elements. The institution may utilize 1, some, 10s, 100s, 1000s, millions or more of such elements.

Corporate governance may require that the storage, transformation or usage of the business information elements be monitored or controlled.

The environment may be populated by technical data elements (TDEs). A TDE may represent one or more of the business elements. A TDE may be used to manipulate, store or transform one or more data. A TDE may be a data field, a source code element, an object code element, any other suitable type of program instruction element, an information storage element, a processing element, a hardware element or any other suitable element of the environment.

Each business information element may correspond to a TDE in the information environment. The tools may provide such monitoring and control by providing monitoring or control of the TDEs that correspond to the business information elements.

The tools may provide a cross-reference between the business information elements and a TDE ("TDE"). The TDE may correspond to one or more other TDEs. Selected business information elements may be identified as key business elements (KBEs). The KBEs may be cross-referenced to the TDEs. When a TDE is cross-referenced to a KBE, the TDE may be identified as a key data element (KDE). Corporate governance principles may be understood in terms of KBEs. The nomenclature, functionality and interrelationships between TDEs and KDEs may be highly technical and cumbersome to work with when establishing monitoring or control programs. The cross-referencing between KBEs and KDEs may provide a way to implement the business principles in the information environment.

The tools may identify a TDE as a KDE. The tools may maintain a roster of the KDEs. The tools may provide a repository that serves as system of record ("SOR") for the KDEs.

The tools may receive from a user a user query for data lineage information about a datum. The datum may be a TDE. The datum may be a KDE. The datum may be a Key Data Element identifier ("KDEI"). The datum may be identified at a consumption point in the information environment. For example, the consumption point may be an analytical or reporting tool. A user or process may identify the datum at the consumption point and desire to discover lineage information of the datum. The lineage may be the lineage of the datum in the information environment. The query may identify the datum as a KBE. The query may identify the datum as a KDE. The tool may request the lineage information from a lineage generation engine.

The tool may provide to the user data lineage information. The data lineage information may include a lineage information element. The lineage information element may include graphical lineage information, textual lineage information, temporal lineage information, comparative lineage information or any other suitable lineage information. The lineage information may include, for one or more times or periods of time, KDE identify information, KDE system of record information, KDE transformation information, KDE hop information, KDE node information or any other suitable information.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 5 shows information from FIG. 3 along with other illustrative information in accordance with the principles of the invention;

FIG. 8 shows yet other illustrative information in accordance with the principles of the invention;

FIG. 17 shows yet other illustrative information in accordance with the principles of the invention;

DETAILED DESCRIPTION OF THE INVENTION

Figure 1:
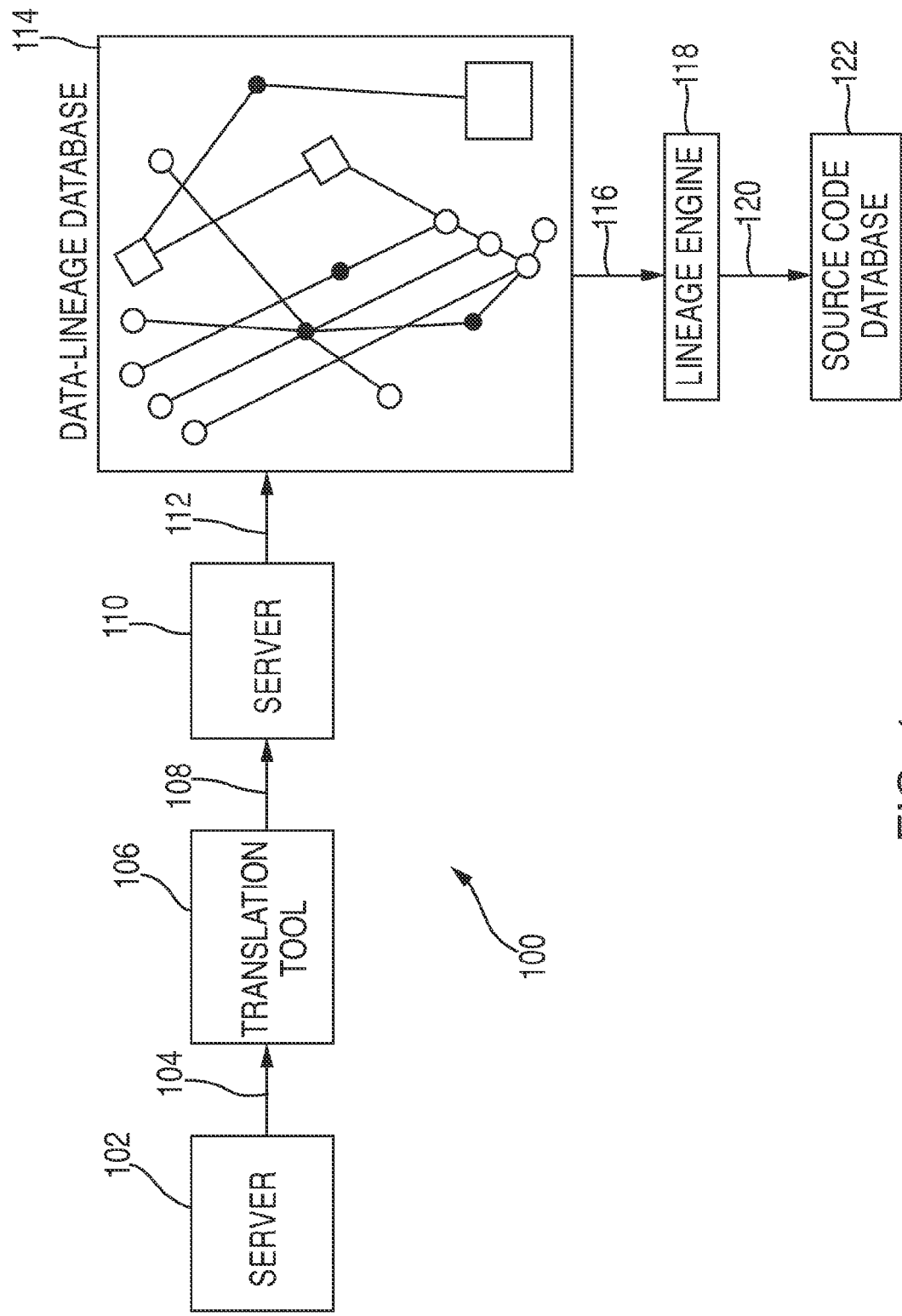
FIG. 1 shows illustrative apparatus in accordance with the principles of the invention.

Apparatus, encoded media, methods and instructions for data discovery and analysis are provided. The apparatus may include machine readable memory that is configured to store a technical data element identifier ("TDEI"). The apparatus may include a receiver that is configured to receive a query for data lineage information corresponding to a business element identifier. The apparatus may include a processor that is configured to: register a logical association between the business element identifier and the TDEI; and formulate the data lineage information of a technical data element ("TDE") associated with the business element identifier.

The TDEI may be one of a plurality of TDEIs. The TDEI may identify a TDE. The TDEI may correspond to a TDE. The TDEI may represent a TDE.

The TDEI may be a first TDEI. The processor may be configured to determine the data lineage information. The processor may retrieve first data lineage information. The first data lineage information may correspond to the first TDEI. The processor may retrieve second data lineage information. The second data lineage information may correspond to a second TDEI. The processor may formulate the data lineage information based on the first data lineage and the second data lineage. The processor may aggregate the data lineage information of the first data lineage information and the second data lineage information.

The processor may be configured to: generate a pointer; and, using the pointer, associate the TDEI with a system of record ("SOR"). The SOR may be the SOR of the TDE associated with the TDEI.

The processor may be configured to associate the TDEI with the business element by cross-referencing the TDEI with the business element.

The TDEI may include a program instruction element.

The processor may be configured to designate the TDEI as a key data element identifier ("KDEI").

The SOR may be a first SOR. The processor may be configured to redirect the pointer from the first SOR to a second SOR. The processor may be configured to redirect the pointer from the first SOR to the second SOR in response to the designation of the TDEI as a KDEI.

The processor may be configured to designate the business element as a key business element ("KBE"). The processor may be configured to designate the business element identifier as a key business element identifier ("KBEI").

Apparatus, encoded media, methods and instructions for configuring role-based security tools are provided.

The receiver may be configured to receive: a business element identifier; a criterion required to access one or more of the plurality of TDEs associated with the business element identifier.

The transmitter may be configured to transmit, to a data lineage information server, a query for data lineage information. The data lineage information may correspond to the business element identifier. The one or more TDEs may be associated with the business element identifier.

The processor may be configured to assign the criterion to teach of the TDEs in the data lineage information.

The receiver may be configured to receive an assignment of a credential. The assignment may be a correspondence between the credential and a prospective credential bearer. The credential may satisfy the criterion. The credential may provide to a bearer permission to utilize, transform, access, view, edit, modify, customize, disable, derive or otherwise use the TDE, KDE and the data lineage information.

The credential may provide to the bearer permission to utilize, transform, access, view, edit, derive, modify, customize, disable or otherwise use a family of TDEs. The credential may be registered directly against a plurality of TDEs in the family. The credential may be registered against the TDE alone and the permission to utilize the TDE may extend to the other TDEs in the family based on a family relationship between the TDEs.

The credential may provide to a bearer permission to utilize, transform, access, view, edit, modify, customize, disable, derive or otherwise use the SOR.

The credential may provide to the bearer permission to utilize, transform, access, view, edit, modify, customize, disable, derive or otherwise use a family of SORs. The credential may be registered directly against a plurality of SORs in the family. The credential may be registered against the SOR alone and the permission to utilize the SOR may extend to the other SORs in the family based on a family relationship between the SORs.

A compliance practitioner may provide the credential to the prospective credential bearer.

The receiver may be configured to electronically receive the credential from the bearer. The processor may be configured to determine, in response to receipt of the credential from the bearer, whether the credential fulfills the criterion.

The processor may be configured to grant to the bearer access to the data lineage information if the credential satisfies the criterion.

The processor may be configured to deny access to the TDE if the credential does not satisfy the criterion.

The processor may be configured to redact at least a portion of the data lineage information if the credential does not satisfy the criterion.

The processor may be configured to designate the TDE as a key data element ("KDE"). The processor may be configured to re-assign, in response to the designation of the TDE as a KDE, the SOR of the KDE.

The receiver may be configured to receive a second criterion. The second criterion may be required to access the one or more TDEs associated with the business element identifier.

Apparatus, encoded media, methods and instructions for configuring data notification tools are provided.

The receiver may be configured to receive: a business element management identifier. The identifier may correspond to an entity that is responsible for management of a business element; and an election. The election may be an election to receive a notification of a change. The change may be a change of data lineage information associated with the business element.

The transmitter may be configured to transmit the election to a data lineage information server.

The processor may be configured to retrieve data lineage of a technical data element ("TDE") associated with the business element.

The receiver may be further configured to receive, from the server, in response to the change, the notification.

The change of data lineage information may correspond to a change of data lineage associated with the business element.

The change of data lineage information may include a change in the system of record ("SOR").

The change may correspond to a change in data lineage information of one or more TDEs associated with the business element.

The change may be a first change. The change of data lineage may be a first change of data lineage. The receiver may be configured to receive an election not to receive a notification of a second change of data lineage information. The second change of data lineage information may correspond to a second change of data lineage.

A change may be initiated by an entity. The entity may be a developer, a vendor, a system, a compliance officer, an employee, an individual or any suitable entity.

The receiver may be configured to receive: an election to receive a notification of a change initiated by a first entity; and an election to not receive a notification of a change initiated by a second entity.

The transmitter may be configured to transmit to a manager or administrator the notification of a change of data lineage information associated with the business element.

The transmitter may be configured to transmit to a manager or administrator a notification of a requested change of data lineage.

The receiver may be configured to receive an instruction to approve the requested change. The receiver may be configured to receive an instruction to reject the requested change.

Apparatus, encoded media, methods and instructions for temporal data lineage analysis are provided.

The machine readable memory may be configured to store a technical data element identifier ("TDEI").

The receiver may be configured to receive a query. The query may be a query for data lineage information. The data lineage information may correspond to a business element identifier.

The processor may be configured to: identify data lineage information for each TDEI corresponding to the business element identifier; identify in the data lineage information a first graph of data lineage information corresponding to a first date; and identify in the data lineage information for a second graph of data lineage information corresponding to a second date.

The apparatus may include a mechanically actuated electronic switch. The apparatus may include a computer-controlled display. The switch may toggle between a display of a first graph of data lineage information and a second graph of data lineage information.

The processor may be configured to identify a change in data lineage information from the first date to the second date information. The processor may be configured to display the change on the first graph or a modification of the first graph. The processor may be configured to display the change on the second graph or a modification of the second graph.

The apparatus may include a repository. The repository may be a data repository. The repository may be a reference repository. The reference repository may be a technical asset reference repository ("TARR"). The repository may be a database. The database may include one or more data structures.

The repository may be associated with one or more systems. The system may be a system of record ("SOR"). The system of record may be an authoritative source of a data element. The data element may be a technical data element, technical asset, key business element or key data element.

The repository may include a pointer. The pointer may be a technical data element identifier ("TDEI"). The pointer may be a first value. The pointer may be a reference point. The pointer may be associated with a second value. The second value may be stored in a database. The pointer may associate a data element with an SOR. The pointer may indicate the location of the SOR. The pointer may link to the SOR. The SOR may be the SOR for a Technical Data Element ("TDE").

The apparatus may include a first database. The database may be an application discovery tool. The application discovery tool may be an SOR. In an illustrative embodiment, the application discovery tool may be the SOR for a TDE. The application discovery may be a provisioning point.

The apparatus may include a second database. The second database may be a Data Management Repository ("DMR"). The DMR may be an SOR for one or more data elements. In an illustrative embodiment, the application discovery tool may the SOR for a TDE. In a further illustrative embodiment, the DMR may be the SOR for a KDE.

The application discovery tool may maintain one or more TDEs. The application discovery tool may store one or more TDEs in computer-readable memory.

The application discovery tool may be a repository. The repository may include scanning capability. The repository may be associated with a scanner. The scanner may scan data. The data may include application code. The scanner may scan the data in real time. The scanner may crawl the data. The scanner may transmit the data to the application discovery tool. The application discovery tool may categorize the data.

The apparatus may designate a TDE as a key data element ("KDE"). The apparatus may designate a TDEI as a key data element identifier ("KDEI"). Designation may be performed by one or more applications, databases or processes. The designation may be input by a user. The user may be an administrator, manager, developer or vendor. The user may flag a TDEI. The flag may transform the TDEI into a KDEI. The TDEI may be transformed into a KDEI. Once designated as a KDEI, the SOR for the TDE may be altered. As a KDEI, the SOR for the KDE may change to the DMR. The altering of the SOR may alter the data lineage of a KDE and/or TDE. The altering of the SOR may alter the governance of the KDE or TDE. The governance may change without changing the topology of the lineage for the KDE or TDE. The TDE SOR may be transferred to the DMR. During the transfer, the TDEI may be transformed into a KDEI.

A software developer, compliance officer, administrator, manager or vendor may use the metadata portal to obtain information regarding the SOR for a TDE. If the TDE is designated as a KDE, the information may indicate that permission is required from an entity that governs the system of record. The entity may correspond to a business, governance or compliance, manager, administrator or other suitable function of the institution. If the TDE is not designated as a KDE, the information may include a plurality of locations in the environment from which a developer may provision the TDE.

The DMR may store one or more TDEs. The DMR may be associated with a metadata tool. The TARR may cross reference data between the application discovery tool and the Metadata tool. The TARR may cross reference data between the application discovery tool and the DMR. The TARR may cross reference data between the Metadata tool and the DMR.

The metadata tool may exchange information with the application discovery tool via a webservice interface.

The apparatus may select a TDE. The TDE may be selected via a TDEI. The TDE may be selected from the application discovery tool. The TDE may be designated as a KDE. The TDEI may be designated as a KDEI. The KDE may be may be stored in the DMR. The DMR may maintain responsibility for the KDE. DMR data may be cross-referenced with data in the application discovery tool. In an illustrative embodiment, TDE data in the application discovery tool may be cross-referenced with KDE data stored in the DMR.

The data may be transferred from the application discovery tool. The data may be transferred to a parsing and rendering tool. The parsing and rendering tool may be a metadata tool. The metadata tool may parse and render the data in a user interface.

Illustrative Lineage Information Load Process

The apparatus may be configured to produce data lineage information. The data lineage information may be a real-time or updated view of the data lineage information. The data lineage information may be the lineage information of one or more KBEs, KBEIs, KDEs, KDEIs, TDEs or TDEIs. The apparatus may track data lineage information. The apparatus may update data lineage information. The apparatus may determine if data lineage information of a particular KBE or KDE has been changed over a specified time period. The apparatus may be configured to display details of the changes in data lineage information.

The lineage information may be determined at programmed intervals. The data lineage information may be automatically updated on a regular basis. Illustrative examples of programmed data lineage information update intervals may include daily, weekly, monthly, annually or any other suitable time period. The data lineage information may be updated on an as-needed or as-requested basis.

The metadata tool may perform a query. The query may be initiated from a Graphical User Interface ("GUI"). The query may trigger a pop-up metadata tool browser. The browser may be located within the metadata tool. The query may be a query to return one or more TDEs. The TDEs may be one or more TDEs referenced by a Key Data Element. The TDEs may be referenced by a Key Business Element. The query may be a query to return all TDEs referenced by a KBE and/or KDE.

The query may be a query to return one or more TDEIs. The TDEIs may be one or more TDEIs corresponding to a business element identifier. The TDEIs may correspond to a KDEI. The query may be a query to return all TDEIs referenced by a KBEI and/or KDEI.

The metadata tool may provide to the application discovery tool a query for data lineage information for one or more TDEs. In response, the application discovery tool may provide the data lineage information to the metadata tool.

In some embodiments, the metadata tool may produce a file that identifies TDEs for which lineage information is requested. The file may identify TDEIs for which data lineage information is requested. The TDEIs may correspond to a business element identifier. The file may be a comma separated value ("CSV") file, or any other suitable file. The file may be transferred to the application discovery tool. The application discovery tool may calculate data lineage information. The data lineage information may be represented in graph logic. The graph logic may be in CSV or any other suitable format.

When the metadata tool receives the lineage information, the metadata tool may render the information in one or more layers. A first layer may provide graphic or textual information about the lineage. A second layer may provide detailed information about lineage of a TDE between a point of consumption and an SOR. A third layer may provide information about transformations of the TDE that occur between different nodes in the lineage map. A user may then actuate one or more display controls in the metadata tool to switch back and forth between the layers. The layers may be rendered upon receipt from the discovery tool to reduce latency during user interaction with the metadata tool.

The apparatus may produce one or more data lineage information maps. The data lineage information maps may be a graphical view, pictorial view, flow-chart, or any other display method of the data lineage information.

The data lineage information may be configured using pre-calculated data. The metadata tool may pre-calculate the data using one or more queries performed on predetermined intervals. The precalculated data may be stored in the TARR. The metadata tool may pre-calculate one or more data lineage information maps. The maps may be illustrations. The illustrations may be in any suitable format. In an illustrative embodiment, the illustrations may be in a JPEG format.

The apparatus may determine a consumption point. The consumption point may be the point at which data is used. One or more data lineage information maps may be configured to display the consumption point. The consumption point may be the utilization point of a data element. The consumption point may be the utilization point of a business element.

The data lineage may be portrayed on a photograph or map. The metadata tool may pre-calculate a first data lineage information map. The first data lineage information map may trace the data lineage information from a KBE to one or more KDEs.

The data lineage information map may be updated. The update may be a real-time update. The update may be scheduled updates based on any preset time period, such as daily, weekly, monthly, annually. The maps may be updated based on a change in data lineage information. The maps may be updated when a technical data element is designated as a key data element. The maps may be updated when a technical data element identifier is designated as a key data element identifier.

The apparatus may include a second data lineage information map. The second data lineage information map may be pre-calculated by the metadata tool. The second data lineage information map may portray data lineage information from a TDE. The second data lineage information map may portray data lineage information from a TDEI. The lineage information may be traced from the TDE to one or more points of consumption. The lineage information may indicate some or all instances of the TDE usage. The lineage information of some or all of the consumption points may be traced. The lineage information may include some or all suitable data lineage information for the TDE. The second data lineage information map may trace the data lineage information from a KDE to one or more TDEs.

The lineage information may portray one or more controls. The controls may be data controls.

The apparatus may include a third data lineage information map. The third data lineage information map may be configured to display one or more transformations. The transformations may be data transformations. In an illustrative embodiment, a transformation may occur when data is transferred from a first database to a second database with value-added processing. In a further illustrative embodiment, a transformation of data may occur when the data is transferred from a database to an application and data is reformatted or calculated prior to transfer. The transformations may be displayed as a transformation drill down image. The drill down image may be configured to determine detailed information related to data lineage. The drill down image may be configured to determine detailed information related to data transformation.

The data lineage information request query may be performed using the metadata tool. The query may request lineage information for a particular KDE. The query may request information for a particular KDEI. The query may request lineage information corresponding to a particular KBE. The query may request lineage information corresponding to a particular KBEI. The query may be initiated from a GUI displaying KBE data. The query may be initiated from a GUI displaying KBEI data. The query may be initiated from a GUI displaying KDE data. The query may be initiated from a GUI displaying KDEI data.

Process for Rendering Transformation Detail

The KBE data may be rendered in the metadata tool. The KDE data may be rendered in the metadata tool. Each KBE may be associated with an icon. Each KBE may be associated with a KBE identifier. Each KBE identifier may be associated with an icon. Each KDE may be associated with an icon. Each KDE may be associated with a KDE identifier. Each KDE identifier may be associated with an icon. The icon may be a lineage information icon. The lineage information icon may be a clickable button, link, image or any suitable form of interactive icon. When clicked, selected or rolled over, the icon may provide access to data lineage information of the associated KBE, KBEI, KDE or KDEI.

The rendered data may be a list of KBEIs or KDEIs. The KBEIs or KDEIs may correspond to KBEs or KDEs. The list may include a column with associated lineage information icons. When selected, the icon may access a new window. The new window may be a pop-up window. The pop-up window may be accessed by calling a URL. The URL may include parameters. The URL may be associated with parameters from the metadata tool.

The parameters may be sent by the metadata tool. The parameters may restrict the capability of the illustration view of lineage information. The parameters may include a KBE ID, KDE ID, or any other suitable parameter. When a KBE parameter is sent via the metadata tool, the metadata tool may interface with the application discovery tool. The metadata tool may utilize the KBE ID to determine data lineage information of the KBE associated with the KBE ID. The KBE ID parameter may be used if data lineage information is queried from a KBE screen. The KDE ID parameter may be used if data lineage information is queried from a KDE screen.

The pop-up window may display data lineage information illustration. A first data lineage information illustration may be a KBE-level data lineage information illustration. The first data lineage information illustration may be viewed if the data lineage information icon is selected from the KBE page. In an illustrative embodiment, a KBE is input into the metadata tool. The metadata tool may load the associated data lineage information corresponding to the specified KBE. The metadata tool may display the data lineage information corresponding to the specified KBE. The data lineage information may include associated KDEIs of the KBE. The data lineage information may include KBEIs corresponding to the KBE. The data lineage information may further include associated TDEIs of the KBE and associated KDEIs. The data lineage information may display some or all associated TDEs and KDEs of the KBE. The data lineage information may display some or all associated TDEIs and KDEIs of the KBE. The data lineage information may display some or all associated TDEIs and KDEIs of the KBEI.

The data lineage information may display the hops of the KDEs. Hops may be the movement between a source position of data to the current data position. A hop may correspond to a transfer, transformation or change of state. A hop may be a transfer between one or more nodes. The transfer may result in a transformation of data. The data lineage information may indicate the presence of hops within the data lineage information. The data lineage information may indicate the presence of nodes within the data lineage information. The nodes may be a state of information. The nodes may be an element. The node may be a persistent state of the data. The persistent state may be a point at which the data may rest in a database.

The pop-up window may display a second data lineage information illustration. The second data lineage information illustration may be displayed if the data lineage information icon is selected from a KDE page. The second data lineage information illustration may be displayed if a drill down view is selected from the KBE user interface. The metadata tool may load the associated data lineage information for the specified KDE. The metadata tool may display the data of the specified KDE. In drill down view, the metadata tool may display KDE-level lineage information corresponding to a KBE.

The data lineage information may indicate distinct points in the data lineage information. The lineage information may indicate transfer points between servers, databases and/or applications. At a first transfer point, the lineage information may indicate that no manipulation has occurred to the data. At a second transfer point, the lineage information may indicate that data transformation has occurred. The transformation may be noted with a visual identifier, such as a diamond shape.

The interface may allow for drill down information. The drill down information may be returned by clicking on the transformation indicator. The drill down information may display transformation information.

The second data lineage information illustration may display lineage information from a technical data element source to a hop. The illustration may further display lineage information from a hop to a target or consumption point.

The pop-up window may display a third data lineage information illustration. The third data lineage information illustration may be displayed if a transformation level view or illustration is requested. The transformation level illustration may be requested from a KDE user interface. The metadata tool may load the associated data lineage information for the data of the associated transformation. The metadata tool may display some or all of the transformation or changes that have occurred to data lineage information. The transformation level may display some or all changes to lineage information within a specified time frame or period.

The third lineage information illustration may display comparisons between two or more versions of data lineage information. The illustration may highlight or otherwise visually indicate the difference between the prior and current versions of data lineage information. The illustration may highlight the shift in data lineage information.

The data lineage information may be displayed in a presentation layer. The data lineage information may be displayed using the metadata tool.

In an illustrative embodiment, the KBE may be viewed on a user interface. A user may select the icon to display data lineage information. The user may select the drill down level view from the KBE screen. The drill down level view may display the KDE level data lineage information.

The metadata tool may include a presentation layer. The presentation layer may take control. The presentation layer may display data lineage information. A user may interact with the presentation layer. The user may click on one or more view options. In an illustrative embodiment, a user may select the drill down option of a KBE. The drill down option may change the viewing capabilities of the apparatus.

The user may view the data lineage information of the KBE. The user may view the consumption point of the KBE. The user may view the KDEs corresponding to the KBE. The user may view the corresponding TDEs of the KBE.

The apparatus may display transformation details. Transformation details may include time, place, database location, user ID, server, actions and any other suitable data transformation details. The user may move back up from a drill down view to a higher level user interface.

Lineage Information Report

An illustrative process performed on the apparatus may include generating a report. The report may be a lineage information report. The lineage information report may be generated from the above-mentioned user interface data.

The generation of the report may use one or more selected KBEs, KBEIs, TDEs, TDEIs, KDEs or KDEIs. The generation of the report may use one or more selected physical data elements ("PDEs"). A PDE may be a TDE. A PDE may be a TDEI. The selected KBE and/or PDE may be used to generate an Excel file, PDF file, CSV or any other suitable file. The file may be opened. The file may be a report of lineage information.

The process may be run for a KBE. If a report option is run for a KBE, related PDE lineage information may be included in the report. If a report option is run for a PDE, the lineage information for only that PDE may be included in the report.

The report may include a visual graphical view. The visual graphical view may be a dynamic interactive view of selected data lineage information. The report may include tabular data. The tabular data may show the associated technical data elements. The tabular data may show the associated TDEIs corresponding to the location of the TDEs. The TDEIs may be shown from hops along the in the lineage information. The TDEs may be shown towards hops along the lineage information chain.

The lineage information report may include transformation drill down code. The lineage information report may not include transformation drill down code.

Data Lineage Information History Execution

The apparatus may be configured to display historical data lineage information. The metadata tool may operate on lineage information from the application discovery tool to capture, identify, illustrate, report or render lineage information changes.

Lineage information-change data capture may encompass any change in data lineage information. The lineage information change may be an addition to the data lineage information of KBEs, KBEIs, KDEs, KDEIs, TDEs or TDEIs. The lineage information change may be a deletion of previously existing data lineage information. The lineage information change may be an altering of the data lineage information pathways. The lineage information change may be any other suitable change to the data lineage information.

The lineage information change may be rendered in a calendar view. The lineage information change data may be stored in the metadata tool.

The apparatus may receive a query. The query may be a request to view data lineage information transformations. The query may include a calendar view. The calendar view may be a calendar selection tool. The calendar selection tool may allow a user to specify one or more dates on an interactive calendar.

The calendar view may display data lineage information history execution. Data lineage information history may include past and present data lineage information. The lineage information history may include the addition of nodes or hops. The user interface may highlight the removal or addition of nodes in the data lineage information history. For example, an added node may be highlighted in the second lineage information image. The user interface may highlight the removal or addition of hops in the data lineage information history. For example, a removed hop may be highlighted in the previous image.

The calendar view may be viewed on a GUI. The calendar view may be viewed at the KDE level. The calendar view may be configured to display KDE data lineage information changes that have been performed over a specific period of time. The calendar view may display the resulting change to the data lineage information.

The calendar view may be further configured to display a comparison. The comparison may highlight or otherwise illustrate changes as related to the current or most recent version of the data lineage information. The user interface may present a visual indication of changes between current data lineage information and prior versions of data lineage information. The calendar view may be configured to display the data lineage information changes of a selected date in comparison with the current data lineage information. Unchanged data lineage information may be displayed for a KBE or KDE. Unchanged data lineage information may not be displayed for a KBE or KDE. Unchanged data lineage information may optionally not be displayed for a KBE or KDE.

The user interface may be configured to provide one or more views. A first view may be configured to display current data lineage information. A second view may be configured to display prior data lineage information. The prior data lineage information may be lineage information from a date or any suitable time frame selected by a user.

The user interface may be configured to present a visual indicator. The visual indicator may be an indication of a selection of changes that have occurred between the prior selected lineage information and the current lineage information. For example, a user may specify that the user interface display only a specific type of data lineage information change. In a further example, a user may specify that the user interface display only a specific field of data lineage information change. The user may specify that certain data lineage information not be displayed. The visual indicator may be an indication of the entirety of changes that have occurred between the prior selected lineage information and the current lineage information. The visual indicator may be a color-coded differentiation between the current data lineage information and the prior data lineage information. The color coded differentiator may highlight prior data lineage information. The color coded differentiator may highlight current data lineage information.

The data lineage information history change-data capture may notate changes to TDE attributes. All changes to data may be configured to trigger a change in data lineage information. Examples include changes to database name, server location of the business element, the unique ID assigned to each Application Inventory Tool (AIT) record that corresponds to an application's unique identifier, the schema name of the data element, the table or copybook name supplying the business element, a name of the column or field, a description of the data type of the data element, the transformation indicator and the transformation code.

Technical Asset UI Integration

The metadata tool may query a list of TDEIs. The TDEIs may correspond to a list of TDEs. The metadata tool may call the list of TDEIs. The list of TDEIs may be queried from the metadata tool. The list of TDEs may be called from the Technical Asset Reference Repository.

The TDEIs and data records may be indexed by an application discovery tool. The index may be available in the metadata tool. The metadata tool may store data lineage information. It should be noted that the application may be used with any suitable webservice. In certain embodiments, the metadata tool may not be required. The metadata tool may be replaced with any suitable webservice. The webservice may interface with the application discovery tool.

The user interface page of the metadata tool may render data from the webservice. The webservice may utilize filtered data. The filtered data may be indexed by the Technical Asset Reference Repository ("TARR").

The indexing by the TARR may store the most recent version of data lineage information in the TARR. For example, where data lineage information is updated by the TARR on a monthly cycle basis, the TARR may store the lineage information data from the most recent month. This may allow for little to no lag time when a data lineage information query is initiated. This may allow for sorting and searching/filtering of returned results.

Process for Rendering Metadata Tool Technical Asset UI Using Web Service

An initial search criteria may be selected in the metadata tool. The selection of the initial search criteria may be performed prior to a call or query to the TARR. A metadata tool search may then be executed. After execution, a first call may be made to the TARR. The call may return results. The results may be based on filter parameters. The results may be based on sort parameters. The filter and sort parameters may be provided by the metadata tool.

Second and additional calls for modified lineage searches, filters and sorting may be handled by the web service and/or the metadata tool. The web service and/or metadata tool may use parameters to perform further searches input by the metadata tool.

Data Lineage Information Modification

The apparatus may be configured to notify one or more users of data lineage information change. The notification may be an alert. The notification may be an automatic notification. The notification may request approval for data lineage information change.

A user may specify specific KDEs to monitor. A user may request alerts for all data lineage information changes for a specific KDE or KBE. A user may request to receive alerts and/or monitor specified types of data lineage information change. For example, a user may request to receive alerts when a first aspect of a KDE lineage information is altered. In a further example, a user may not request to receive alerts when a second aspect of a KDE lineage information is altered.

A user may subscribe to alerts for data lineage information changes. For example, a sales executive may request auto-notification when sales KDE lineage information is altered.

Certain executives or users may be granted the ability to approve data lineage information modification prior to actual modification. For example, a downstream user may attempt to alter data lineage information of a first specified KBE. A compliance officer may subscribe to alerts whenever the data lineage information of the first specified KBE may be altered. The compliance officer may be required to approve the KBE data lineage information alteration.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage encoded media having computer-readable program code, or instructions, embodied in or on the storage encoded media. Any suitable computer readable storage encoded media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting encoded media such as metal wires, optical fibers, and/or wireless transmission encoded media (e.g., air and/or space).

Processes in accordance with the principles of the invention may include one or more features of the processes illustrated in FIGS. 6, 10, 13, 14, 16, 18 and 20. For the sake of illustration, the steps of the processes illustrated in FIGS. 6, 10, 13, 14, 16, 18 and 20 will be described as being performed by a "system." The "system" may include one or more of the features of the apparatus that are shown or described herein and/or any other suitable device or approach. The "system" may be provided by an entity. The entity may be an individual, an organization or any other suitable entity.

Illustrative information that is exchanged with the system may be transmitted and displayed using any suitable markup language under any suitable protocol, such as those based on JAVA, COCOA, XML or any other suitable and languages or protocols.

FIG. 1 shows illustrative data lineage information flow in apparatus 100. Apparatus 100 may be any suitable machine, system, server, database or method, or any combination thereof.

Apparatus 100 may include user interface 102. User Interface 102 may include a Graphical User Interface ("GUI"). User interface 102 may include a display. User interface 102 may include an input device (not shown). User interface 102 may include a view or window within the apparatus. User interface 102 may include a view or window within a metadata tool. User interface 102 may include an apparatus in connection with additional products. The additional products may be a part of apparatus 100.

User interface 102 may display any suitable information. User interface 102 may display any suitable computer program interface or software interface. Exemplary displays presented by user interface 102 may include a webpage, web-portal view or word processing software. The information may be received by user interface 102. User interface 102 may receive the information from any suitable source, such as a user input, database, server, computer, software program, network, modem or system. User interface 102 may retrieve information.

User interface 102 may display data lineage information. The data lineage information may be based on some or all of the data lineage of a TDE or a KDE. The data lineage information may be based on some or all of the data lineage of a TDEI or KDEI.

The data lineage information may include a map. The map may show relationships between two or more points of data lineage information. The data lineage information may include data transformation, creation, deletion, editing, access, source, movement, use, manipulation, logic, formatting, derivation, data relationships or any suitable use of a datum. The data lineage information may include source code, hops or nodes. The data lineage information may include data transformation details.

The data lineage information may include a business element. The business element may be any suitable business element. The business element may be a key business element ("KBE"). The business element may be designated as a KBE. The data lineage information may include a list of two or more business elements.

The business element may be a business category. The business element may be a business product. Any datum or element may be designated as a business element. The business element may be a line-of-business, banking unit, financial product, or any other suitable business element. The business element may be associated with a business identifier.

The data lineage information may include one or more data elements. The data element may be a technical data element ("TDE"). The TDE may be associated with a TDE identifier ("TDEI"). The TDE may be a KDE. The KDE may be associated with a KDE identifier. The data lineage information may include a list of two or more TDEIs. The two or more TDEIs may correspond to two or more TDEs.

User interface 102 may display terms, definitions and relationships of one or more business elements, KBEs, KBEIs, TDEs, TDEIs, KDEs and KDEIs.

Each business element, KBE, KBEI, TDE, TDEI, KDE or KDEI may be associated with an icon. The icon may link to data lineage information associated with the business element, business element identifier, KBE, KBEI, TDE, TDEI, KDE or KDEI. Each icon may link to unique data lineage information.

User interface 102 may display clickable icons. The clickable icons may link to data lineage information.

The input may be user input. The input may be from a computer system, server or database. The input may be automated input. The input may be manual input.

Using user interface 102, a user may input a query. The query may request a return. The return may include the data lineage information.

User interface 102 may transmit the query via pathway 104. Pathway 104 may be a hardware pathway, a software pathway, a networked pathway, any combination thereof or any suitable pathway. Pathway 104 may facilitate interaction between user interface 102 and translation tool 106.

Translation tool 106 may receive a query from user interface 102. The query may be received via pathway 104. Translation tool 106 may determine one or more elements associated with the query.

User interface 102 may receive a user input. The user input may be a query. The query may be a request for information. The information may be data lineage information. The request may be a request to retrieve data lineage information. The request may be a request to determine if any changes have occurred to data lineage. The request may be any suitable request related to data lineage.

The request may include an input term. The input term may be input into user interface 102. The input term may be a business term. Table 1 shows illustrative business element. The input term may be a technical term.

The input term may be an identifier. The identifier may be a numerical identifier, alphabetical identifier, symbol, pictographic identifier, code or any other suitable identifier. The identifier may be a business identifier. The business identifier may correspond to any of the business elements in Table 1. The business identifier may correspond to any suitable business element. The identifier may be a TDE identifier. The TDE identifier may correspond to any suitable TDE.

TABLE 1

Illustrative Business Elements
Business Elements

Personal Information
Location
Address
Social Security Number
Debit Card
Credit Card
Duration
State
Postal Code
Account Balance
Checking
Manufacturing
Duration
Services
Region
Category
Merchant Name
Payment Instrument
ACH
Automated Teller Machine ("ATM")
Cash
Home Equity
Credit Line

TABLE 1-continued

Illustrative Business Elements
Business Elements

Identifier
Corporate
E-mail address
Password
Username
Telephone Number
Payee
Recent Activity
Outstanding debt
Accounts
Accounts Payable
Accounts Receivable
Accrual
Interest
Dispute
Gross
Net
Capital
Expenditures
Overhead
Appreciation
Dependents
Return
Tax
Primary
IRA
401(k)
Investment
Mortgage
Lease
Home
Auto
Investment Banking
Wealth Management
Trade
Sales
Commission
Government
Rules
Law
Balance
Statement
Value
Market
Discount
Bond
Treasury
Stock
Mutual Fund
System of Record
Line of business
Manager
Unit
Database
Business Unit
Group
Compliance
Consumer Credit
Commercial Products User interface 102 may receive user input of an exemplary term. The exemplary term may be a business element. The business element may be consumer credit. The user may input a request into user interface 102 to determine information. The information may be data lineage information related to consumer credit.

User interface 102 may transmit a request to translation tool 106. User interface 102 may transmit an instruction to translation tool 106. The request or instruction may relate to a business element. User interface 102 may instruct translation tool 106 to retrieve data lineage information for one or more business elements. User interface 102 may instruct translation tool 106 to retrieve data lineage information for one or more business element identifiers.

Translation tool 106 may retrieve data lineage information corresponding to the business element or business element identifier received from user interface 102.

Translation tool 106 may determine the technical data corresponding to the business element received from user interface 102. The technical data may be retrieved as TDE identifiers. The TDE identifiers may correspond to TDEs.

Translation tool 106 may look-up, retrieve, query, determine or access a look-up table. The look-up table may include a list of business element identifiers. The look-up table may associate the business element identifiers with corresponding TDE identifiers.

Translation tool 106 may translate a business element. The business element may be translated into a data element. Translation tool 106 may translate a data element. The data element may be translated into a business element. Translation may include receiving a query for data lineage information of a business element identifier. Translation tool 106 may retrieve one or more TDE identifiers that correspond to the business element identifier. The TDE identifiers may correspond to TDEs.

Translation tool 106 may query a server, database, system, or any suitable program or apparatus for technical data associated with the business element.

Translation tool 106 may query a user or system for an input. The query may be a request to input an association between a business element and technical data elements. The query may be a request to input an association between a business element identifier and one or more TDE identifiers.

Translation tool 106 may include a processor. Translation tool 106 may determine technical data elements that may correspond to a business element. Translation tool 106 may be programmed to calculate or determine technical data elements associated with a business element. Translation tool 106 may be programmed to calculate or determine TDE identifiers associated with a business element identifier. Translation tool 106 may be programmed using an algorithm or any suitable program.

Translation tool 106 may transmit a request for data lineage information. Translation tool 106 may request data lineage information for a technical data element. The technical data element may correspond to a business element. The TDE may correspond to a TDE identifier. The TDE identifier may correspond to a business element identifier. The business element identifier may correspond to a business element.

Translation tool 106 may transmit a request for data lineage information via pathway 108. Pathway 108 may interface between translation tool 106 and server 110. Translation tool 106 may submit a query to server 110 to retrieve data lineage information associated with a technical data element.

Translation tool 106 may determine data lineage information corresponding to a business element. The data may be some or all of the data lineage information corresponding to the business element. For example, user interface 102 may receive a query to retrieve the SOR for a business element. The business element may correspond to a business group. The business group may be commercial products.

User interface 102 may transmit the query to translation tool 106. The query may be submitted via pathway 104. Translation tool 106 may determine one or more business elements corresponding to the business group. Translation tool 106 may determine one or more technical data elements corresponding to the business elements. Translation tool 106 may determine one or more technical data elements corresponding to the business group.

Translation tool 106 may transmit a request via pathway 108 to server 110.

Server 110 may generate information. The information may be data lineage information. Server 110 may generate data lineage information from data retrieved from database 114.

Server 110 may retrieve data lineage data from database 114. Server 110 may interface with database 114 via pathway 112. Server 110 may retrieve data from database 114. The data may be raw data. The data may be data lineage. Server 110 may process the data from database 114. Server 110 may process the data lineage from database 114. Server 110 may generate data lineage information from the data retrieved from database 114.

Server 110 may initiate data retrieval without prior instructions. Server 110 may be programmed, using any suitable method, to retrieve data lineage information at pre-determined intervals. The data lineage information may be some or all of the data lineage information.

The interval may be any suitable interval. Exemplary intervals may include time-based intervals, number of movements or transactions for data, time between changes in SOR, new database access or any other suitable customizable interval.

Server 110 may store the retrieved data lineage information. The retrieved data lineage information may be stored using any suitable method. Server 110 may store the retrieved data lineage information in memory. The stored data lineage information may be updated at a pre-determined interval. The update may include changes to data lineage information.

Server 110 may transmit a request to database 114. The request may be a request for data lineage information. The request may be a request for data lineage. The request may be a request for data lineage information corresponding to one or more data elements. The data elements may be associated with a business element. The request may be a request for data lineage corresponding to data lineage information provided by server 110. The data lineage information may correspond to one or more data elements.

Database 114 may be a storage database. Database 114 may be any suitable system, server or database, or a connection of one or more systems, servers and databases. Database 114 may store data lineage.

Database 114 may receive data lineage via pathway 116. Pathway 116 may interface between database 114 and lineage engine 118.

Lineage engine 118 may generate information. The information may be data lineage information. Lineage engine 118 may transmit generated data lineage information to database 114. Database 114 may store the data lineage information. Database 114 may store the data lineage information in memory.

Lineage engine 118 may retrieve data lineage. Lineage engine 118 may retrieve data lineage via pathway 120. Pathway 120 may interface between lineage engine 118 and source code database 122.

Lineage engine 118 may continuously scan for data. The scanning may include data crawling. Lineage engine 118 may document data location. Lineage engine 118 may discover data. Lineage engine 118 may document the interactions of all data within a system. The system may be all of the interconnected databases, applications, servers and networks of an institution. The institution may be a financial institution.

Lineage engine 118 may collect all data relationships. Lineage engine 118 may collect all data logic, transformations or any other suitable data. Lineage engine 118 may collect information for TDEs. The TDE information may be information for all TDEs within a system. Lineage engine 118 may collect information for TDE identifiers corresponding to TDEs.1

Lineage engine 118 may discover the location of each TDE or KDE. Lineage engine 118 may assign a TDE identifier or KDE identifier to each discovered TDE or KDE. Lineage engine 118 may discover all data related to each TDE or KDE. Lineage engine 118 may discover the system of record for each TDE or KDE. Lineage engine 118 may organize the data. The organization may include a flow. The flow may be a data flow.

Lineage engine 118 may process the data. The data may be processed into data lineage. Lineage engine 118 may generate data lineage information from the data lineage.

Lineage engine 118 may transmit data lineage to database 114. Database 114 may store the data lineage. The data lineage may be retrieved by server 110. Server 110 may use the retrieved data lineage to generate data lineage information.

Lineage engine 118 may transmit generated data lineage information to database 114. Database 114 may store the data lineage information. The data lineage information may be retrieved by server 110.

Lineage engine 118 may synchronize with database 114. The synchronization may occur at any suitable time. The synchronization may occur on a predetermined basis.

Lineage engine 118 may discover data lineage. Data lineage may be discovered by processing code. The code may be source code. The source code may be sorted. The source code may be retrieved from database 122.

Database 122 may interact with lineage engine 118 via pathway 120. Lineage engine 118 may discover locations, transformations, logic or any other suitable data.

Lineage engine 118 may document, tag, flag or otherwise identify the existence of data lineage. Lineage engine 118 may not be capable of documenting data lineage information of the data lineage. Lineage engine 118 may transmit the data lineage to database 114.

In an example, a user may input a request for data lineage of a business element. The request may be input into user interface 102. User interface may transmit the request to translation tool 106. Translation tool 106 may determine a data element corresponding to the business element. Translation tool 106 may transmit the data element to server 110.

Server 110 may retrieve data lineage information. The data lineage information may be retrieved from database 114. Database 114 may receive generated data lineage information from lineage engine 118.

Lineage engine 118 may generate data lineage information from data lineage. The data lineage information may be generated from source code database 122.

Server 110 may transmit the retrieved data lineage information. Server 110 may transmit the retrieved data lineage information to translation tool 106.

Server 110 may render the data lineage information. The data lineage information may be rendered into simplified technical data. The simplified technical data may be synoptic data. The synoptic data may be a synoptic view of the data lineage information.

Server 106 may utilize a filter. The filter may remove excess code. The filter may remove unnecessary or unimportant technical data elements.

Translation tool 106 may render data lineage information in any suitable arrangement. For example, the data lineage information may be translated in whole or in part back into business elements. The data lineage information may display certain aspects of data lineage information, such as a system of record.

Figure 2:
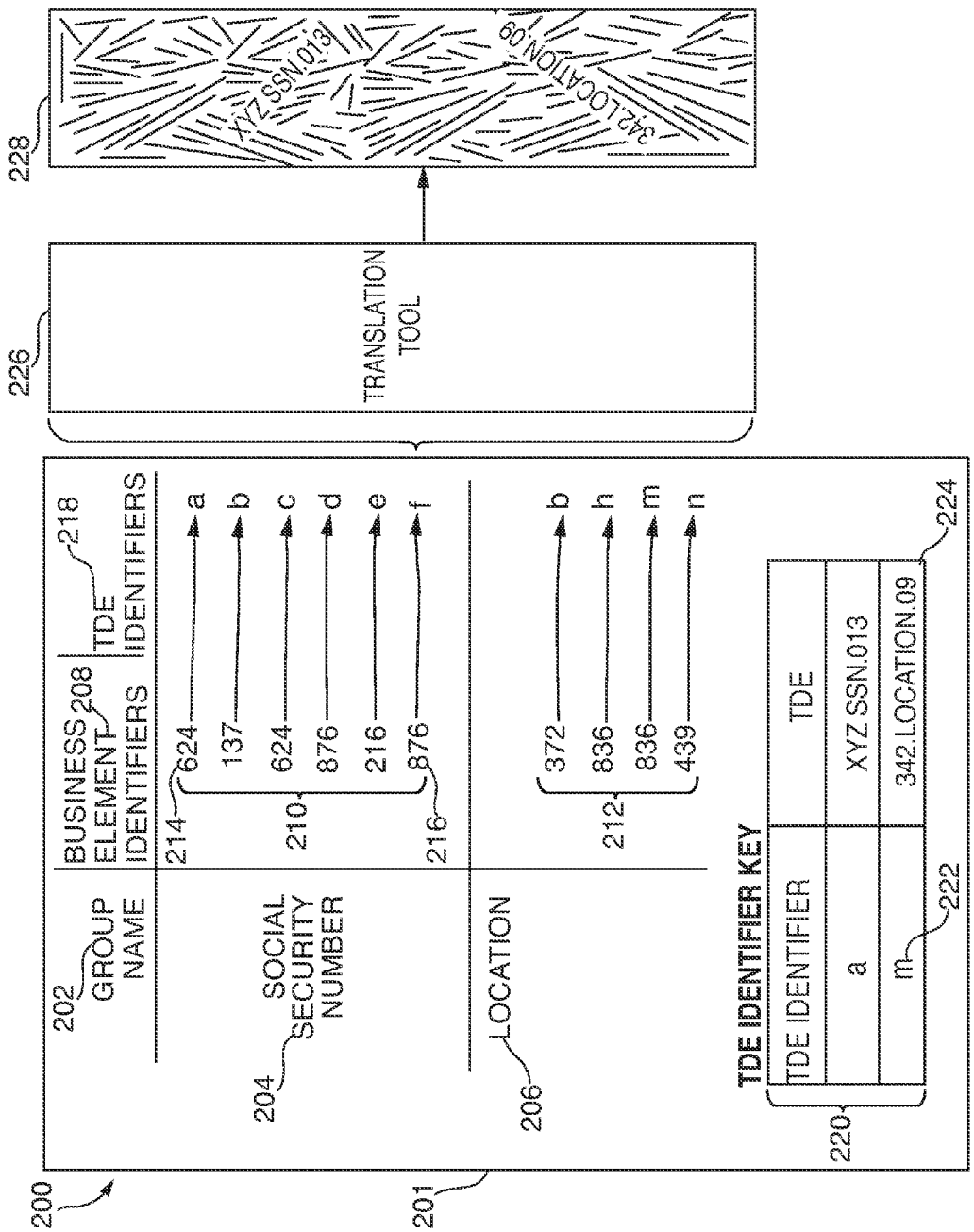
FIG. 2 shows illustrative information in accordance with the principles of the invention along with some of the apparatus shown in FIG. 1.

FIG. 2 shows illustrative arrangement 200. Arrangement 200 may be a detailed view. The detailed view may display relationships.

Arrangement 200 shows a determination of one or more TDEIs corresponding to a business element identifier. The determination may be by a translation tool. The translation tool may include some or all of the elements of translation tool 106, described above in FIG. 1.

Arrangement 200 may reside in physical memory. Arrangement 200 may reside in a server, system or database. Arrangement 200 may be retrieved. The retrieval of arrangement 200 may occur when a request for data lineage information occurs. A translation tool may retrieve arrangement 200.

Arrangement 200 may be manually generated. Manual generation may be user input. Arrangement 200 may be automatically generated. Automatic generation may be based on a computer program, machine learning, artificial intelligence, algorithms or any other suitable method.

Arrangement 200 may include group names 202. Group name 202 may be an illustrative business element grouping. The grouping may be a business element (shown, e.g. in Table 1). The grouping may be a business element identifier. The grouping may be an arrangement of related or associated business elements. The business element may be any suitable business element. Exemplary business elements are presented above in Table 1.

Group name 202 may include groupings 204 and 206. Grouping 204 may be any suitable grouping of business elements or business element identifiers. Grouping 204 may be a business element. The grouping 204 business element may represent a broad business element. The broad business element may be further associated with narrower business elements. For example, grouping 204 may be social security number. Grouping 206 may be any suitable business element or grouping of business elements. Grouping 206 may be a location.

Groupings 204 and 206 may be associated with business element identifiers 208. Business element identifiers 208 may identify narrower business elements. The narrower business elements may make up a grouping.

Each of groupings 204 and 206 may be associated with one or more identifiers. Each of business element identifiers 208 may be uniquely assigned to groupings 204 or 206. Each of business element identifiers 208 may be assigned to multiple business elements. Each business element may be assigned one or more business element identifiers.

Business element identifiers 208 may include one or more identifiers associated with a business element. Identifier group 210 may correspond to grouping 204. Individual identifiers from identifier group 210 may be associated with a business element.

For example, identifier 214 may identify a business element. The business element may be a key business element. The business element may be associated with a business category. Identifier 214 may identify a business element. The business element may be "Last 4." Last 4 may be the last four numbers of an individual's social security number.

Identifier 216 may identify a second business element. Identifier 214 and 216 may be associated with a larger grouping of business elements, such as grouping 204. Identifier 216 may identify the business element "FIRST NUMBER OF SOCIAL SECURITY NUMBER."

Identifier group 212 may be associated with grouping 206.

Each of business element identifiers 208 may correspond to one or more of TDE identifiers 218. TDE identifiers 218 may correspond to one or more TDEs. The TDEs may correspond to a business element. The TDEs may correspond to a business element identifier.

For example, business element identifier 216 may correspond to TDE identifiers "d" and "e." TDE identifiers "d" and "e" may represent technical data elements associated with a business element.

Arrangement 200 may include key 220. Key 220 may illustrate the correspondence between a TDE identifier and a TDE. The TDE identifier may represent a TDE. TDE identifier 222, illustrated as identifier "m," may represent TDE 224, illustrated as a piece of technical code.

Business element identifiers 208 and TDE identifiers 218 may be used to represent the existence of physical data. The physical data may be business elements. The physical data may be TDEs. The physical data may reside in memory, hardware, servers, systems or databases.

Business element identifiers 208 and TDE identifiers 218 may be used as reference identifiers. Translation tool 226 may attempt to determine data elements corresponding to a business element. The physical data may reside in any suitable database, such as database 228.

Figure 3:
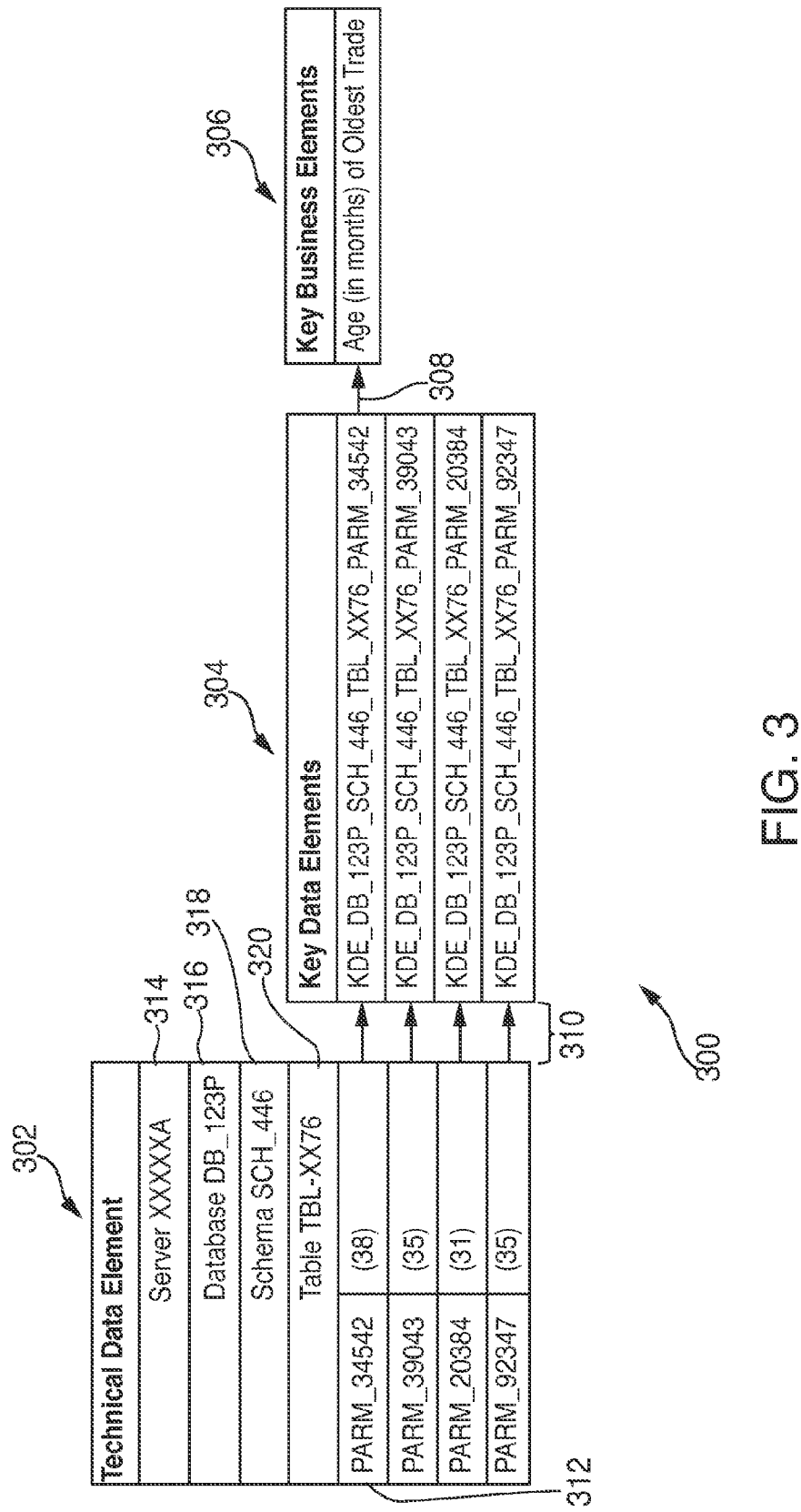
FIG. 3 shows other illustrative information in accordance with the principles of the invention.

FIG. 3 shows illustrative data lineage information 300. Data lineage information 300 may incorporate output from one or more of translation tool 106, server 110, lineage engine 118 and source code database 122, discussed above in FIG. 1.

Data lineage information 300 may be displayed on a Graphical User Interface ("GUI"). The GUI may be displayed to a user.

Lineage information 300 may be accessed after a business element identifier is entered into a metadata portal. Lineage information 300 may be retrieved via process 100. Lineage information 300 may be previously retrieved. The retrieved lineage information 300 may be stored in a server.

Lineage information 300 may be rendered as a JPEG, or any other suitable illustration.

Lineage information 300 may be business level data lineage information. The business level data lineage information may be key business element data lineage information. For example, a compliance officer may enter a business element identifier into a GUI. The compliance officer may seek to verify data lineage information. The business element identifier may link to lineage information 300.

Lineage information 300 may include Technical Data Element ("TDE") 302. TDE 302 may be one or more TDEs associated with a business element or business element identifier. TDE 302 may be retrieved from a Technical Asset Reference Repository ("TARR"). The TARR may store the associations between one or more TDEs, KDEs and KBEs.

Exemplary retrieval process for TDE 302 may be as follows. A user may input a business element or business element identifier. The user may input a query. The query may be a request to retrieve data lineage information corresponding to the business element. The user may input the request into a server. The server may transmit the request to a translation tool. The translation tool may determine one or more TDEs or TDEIs associated with the business element or business element identifier. The TDE may be a KDE.

The translation tool may then transmit a request for data lineage information corresponding to the one or more TDEs or TDEIs associated with the business element. The request may be transmitted to a server. The server may have previously loaded the lineage information. The previously loaded lineage information may be stored in memory.

The server may generate data lineage information for the TDEs. The data lineage information may be generated using data retrieved from a database. The data retrieved from the database may be data lineage. The server may generate data lineage information from the data retrieved from the database. The server may retrieve data lineage information for the TDEs.

The database may be a storage database. The database may interface with a lineage engine. The lineage engine may generate data lineage information. The lineage engine may retrieve data lineage from a source code database. The lineage engine may retrieve data lineage by processing source code retrieved from the source code database.

Lineage information 300 may include Key Data Elements 304. KDEs 304 may be one or more KDEs associated with a business element identifier. KDE 304 may be a KDEI. KDE 304 may include any suitable KDE information. Illustrative KDE information may include nodes, hops, logic, derivation, transformation or any other suitable information. KDE 304 may correspond to the data in TDE 302.

Lineage information 300 may include Key Business Element 306. KBE 306 may be the KBE corresponding to the KBE identifier. The KBE or KBE identifier may be input into a browser. The browser may return lineage information 300.

Figure 4:
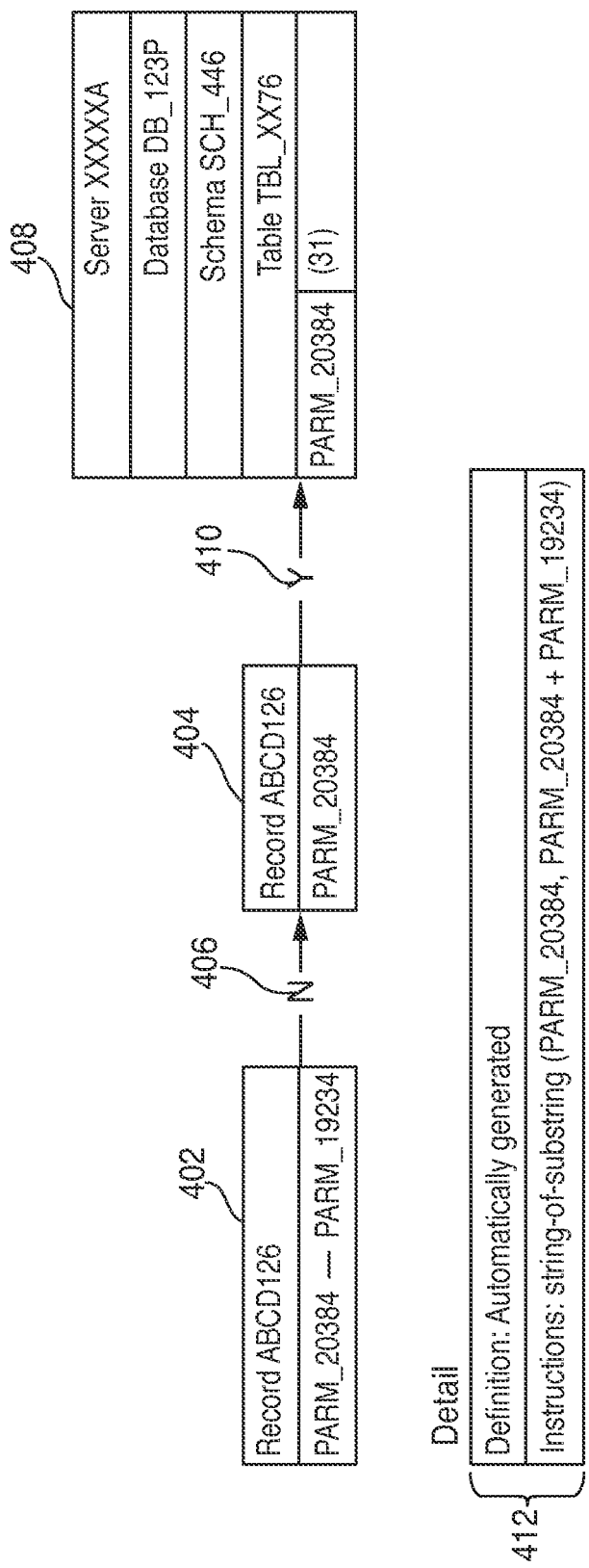
FIG. 4 shows information from FIG. 3 along with other illustrative information in accordance with the principles of the invention.

FIG. 4 shows illustrative data lineage information. Lineage information may include lineage level 400. Lineage level 400 may be data lineage information. The data lineage information may be TDE lineage information. The TDE may be a KDE.

Lineage level 400 may be accessed from a GUI. Lineage level 400 may be a drill-down view. The GUI may display lineage level 400 from a business element identifier drill-down view.

Lineage level 400 may include an identifier. The identifier may correspond to a TDE. Lineage level 400 may include TDE identifier ("TDEI") 402. TDEI 402 may be any suitable data element identifier. TDEI 402 may correspond to a TDE located in a first database. TDEI 402 may correspond to TDE transferred to a second database. TDEI 402 may correspond to a TDE that remains in the first database. TDEI 402 may correspond to a first node. The first node may be a source node.

Lineage level 400 may include TDEI 404. TDEI 404 may correspond to a TDE located in the first database. TDEI 404 may correspond to a TDE located in the second database. TDEI 404 may correspond to a TDE located in the same database as the TDE that corresponds to TDEI 402. TDEI 404 may correspond to a TDE be located in a different database than the TDE that corresponds to TDEI 402. TDEI 404 may correspond to a second node. The second node may be a target node.

Lineage level 400 may include hop 406. Hop 406 may be a persistent state of the data. Hop 406 may move data from TDE 402 to 404. Hop 406 may be associated with an indicator. The indicator may be any suitable indicator or visual identifier, such as an alphanumeric identifier, shape, color or symbol. The indicator may indicate if any transformation has occurred to the data. The transformation may be displayed as data lineage information. Hop 406 may indicate that, between TDE 402 and TDE 404, no data transformation has occurred.

Lineage level 400 may include TDE 408. TDE 408 may be any suitable data element. TDE 408 may be a node. The node may be a third node. TDE 408 may reside in a third database. TDE 408 may reside in the same database as one or both of TDE 402 and TDE 404.

Lineage level 400 may include hop 410. Hop 410 may move data from TDE 404 to TDE 408. Hop 410 may be associated with an indicator. The indicator may indicate if any data transformation has occurred. The transformation may be data lineage information. Hop 410 may indicate that data transformation has occurred. The indicator may be clicked on to view more detailed information. The detailed information may be information about the data transformation.

The detailed information may include details 412. Details 412 may display transformation details.

FIG. 5 shows illustrative view of data lineage information 500.

Data lineage information 500 may be displayed on a user interface. Information 500 may include may include one or more columns. Column 501 may display one or more Key Data Element IDs. The KDE IDs may be any suitable alphanumeric identifier. The KDE IDs may be randomly generated.

Column 503 may display server information for the associated KDE ID from column 501. The server information may be the physical location of the KDE file.

Column 505 may display database/location information of the KDE ID. The database/location information may be a System of Record. The database/location information may be a physical location in memory.

Column 507 may display schema associated with the KDE ID.

Column 509 may display table/file information associated with the KDE ID.

Column 511 may display column/field information associated with the KDE ID.

Column 513 may display action options. The action options may include icon 215. Icon 515 may be a clickable icon. Icon 515 may be selected by a user. Icon 515 may be configured to open a pop-up browser window when clicked. The pop-up browser window may display data lineage of the KDE ID.

Table 517 shows illustrative cross-referenced information. The cross-referenced information may be business element information associated with the KDEs. The information may be cross-referenced to a KDE ID. The information may be a business element identifier. Table 517 may include any suitable cross-reference information for a KDE. For example, the information may include KDE ID 519. KDE ID 519 may identify the corresponding cross-referenced KDE for table 517.

A KDE may be uniquely identified by a unique KDE identifier that may include a combination of metadata elements. The metadata elements may include one or more of KDE ID 501, server 503, database/location 505, schema 507, table/file 509, column/field 511 or any other suitable metadata. The unique KDE identifier may associate the KDE with a single TDE. The KDE identifier may associate the KDE with a business element.

Table 517 may include KBE name 521. KBE name 521 may include the business element name cross-referenced with the KDE. The KDE may correspond to KDE ID 519. The business name may be a KBE. For example, the business element name may be "Age of Oldest Trade."

KBE name 521 may be associated with business description 523. Business description 523 may be a description of KBE name 521. Business description 523 may identify the purpose of KBE name 521.

Table 517 may include security classification 525 and creation date 527. Security classification 525 may be access criteria or requirements for a KBE, business element KDE or TDE. Table 517 may further include information about the user who last updated the cross reference. This may be information 529.

Figure 6:
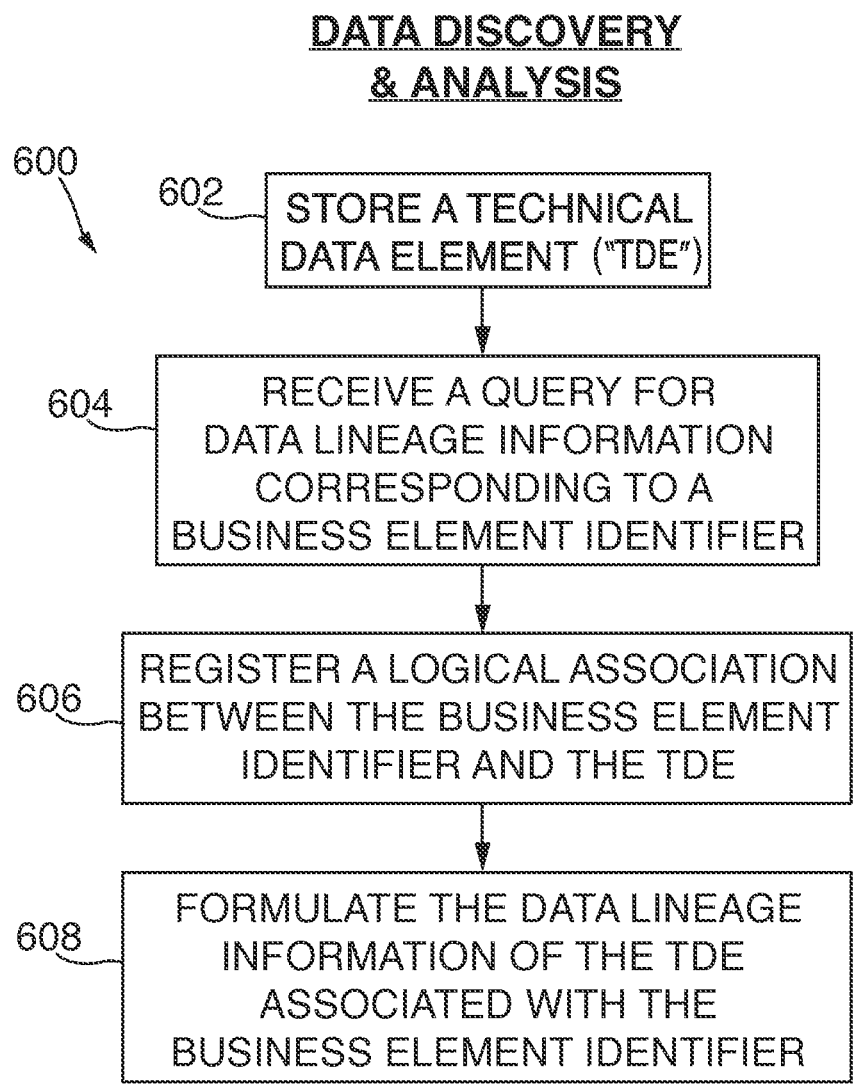
FIG. 6 shows illustrative steps of a process in accordance with the principles of the invention.

FIG. 6 shows illustrative process 600.

Process 600 may be a process for data discovery. Process 600 may be a process for data analysis.

At step 602, the system may store an element. The element may be a datum. The element may be a technical data element. The element may be a technical data element ("TDE"). The TDE may be a TDEI.

The TDE may be a key data element ("KDE"). The KDE may be a KDEI. The TDE may be re-categorized as a KDE. The TDEI may be re-categorized as a KDEI. The KDE may be stored in a first database as a TDE. The KDEI may correspond to a KDE stored in a first database as a KDE. The KDE may be stored in a second database as a KDE. The KDEI may correspond to a KDE stored in a second database as a KDE. The TDE may be flagged as a KDE. The TDEI may be flagged as a KDEI.

At step 604, the system may receive a query. The query may be a request. The request may a request for information. The request may be a request to retrieve information. The information may be lineage information. The lineage information may be data lineage information.

The data lineage information may correspond to a business element. The business element may be any suitable business element. Exemplary business elements are shown above in Table 1.

The business element may be associated with a business element identifier. The system may receive a request to retrieve data lineage information corresponding to the business element identifier.

At step 606, the system may register an association. The association may be a logical association. The association may be an association between the business element identifier and a TDE. The association may be an association between the business element identifier and a TDE identifier. The association may be an association between a TDE identifier and a TDE. The association may link a TDE to a business element identifier.

At step 608, the system may formulate the data lineage information. The data lineage information may be data lineage information of one or more TDEs. The one or more TDEs may be associated with a business element. The one or more TDEs may be associated with a business element identifier.

The data lineage information may be formulated using a translation tool. The translation tool may generate data lineage information. The translation tool may retrieve data lineage information.

Figure 7:
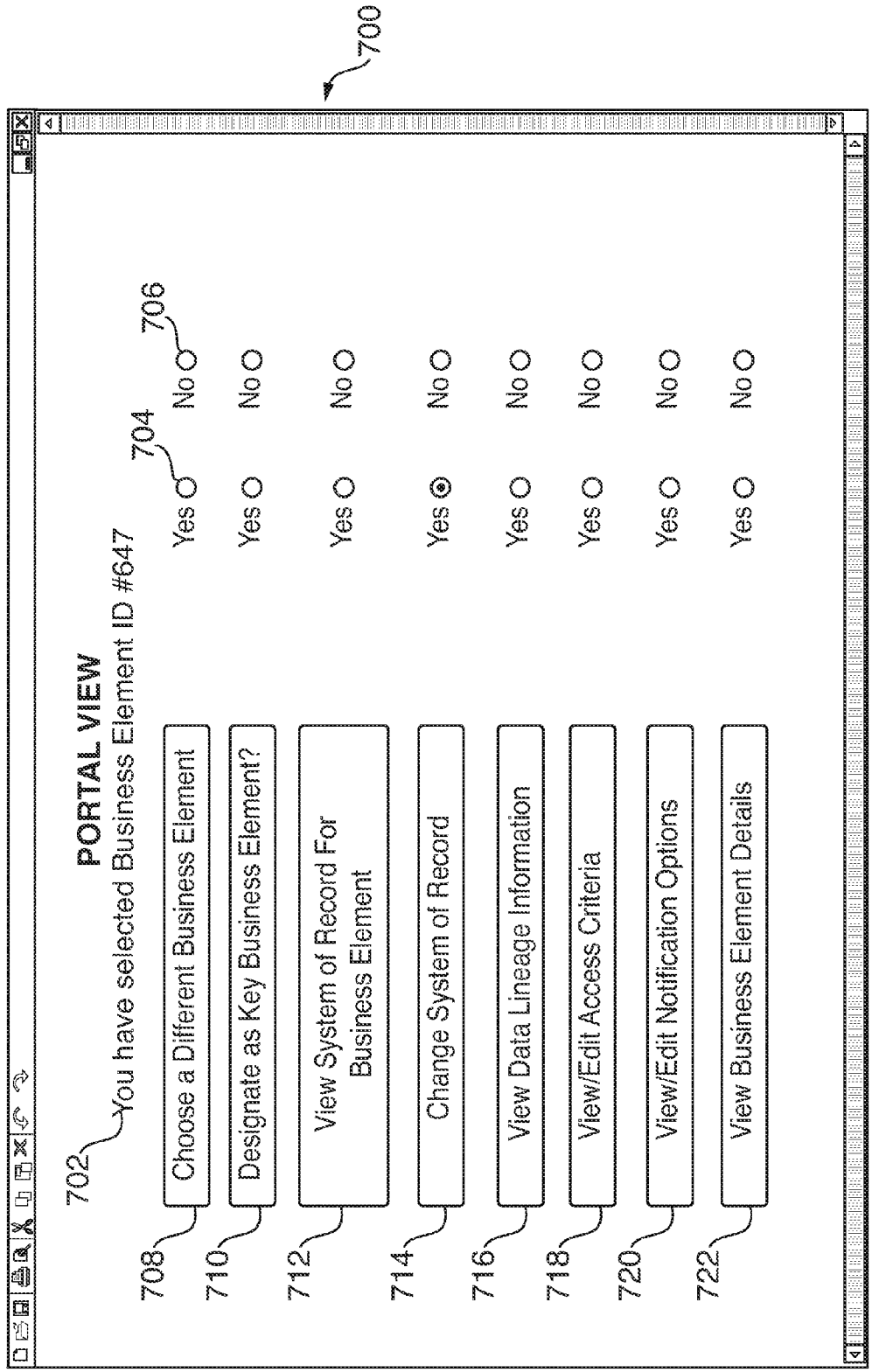
FIG. 7 shows still other illustrative information in accordance with the principles of the invention.

FIG. 7 shows illustrative Graphical User Interface ("GUI") 700.

GUI 700 may be a display. The display may be displayed on a screen. The display may be viewable to a user.

GUI 700 may include heading 702. Heading 702 may identify information. The information may be information display on GUI 700.

GUI 700 may include controls 708, 710, 712, 714, 716, 718, 720 and 722, referred to alternatively hereinafter as "the controls." The controls may be clickable. The controls may link to one or more additional GUIs, programs, databases, systems or servers.

Each of the controls may correspond to an option. The option may be a user option. The user option may be an option to customize data lineage information.

Each of the controls may be associated control modifiers 704 and 706. Modifiers 704 and 706 may allow a user to customize one or more of the controls.

Control 708 may be a user control. Control 708 may allow a user to choose a business element. The business element may differ from the business element displayed on GUI 700. To choose a different business element, the user may select control modifier 704. Once selected, the user may be redirected or otherwise transferred to a different GUI.

Additional controls may be implemented in addition to the controls displayed in GUI 700. For example, after selecting control modifier 704, a user may be prompted with a control. The control may be an authentication system. The authentication system may require user input or verification. Once satisfied, the user input or verification may allow the user to complete the requested change.

After selecting control modifier 704, the user may be prompted to authenticate. The authentication may ensure that the user is allowed to make the necessary change. If the authentication or verification fails, no action may be taken. The user may be returned to GUI 700. The user may be logged out of the system. The display of GUI 700 may expire.

Some or all of the controls may require authentication. Some or all of the controls may link or transfer to one or more additional GUIs or programs.

Control 710 may be a user control. Control 710 may allow a user to designate the business element displayed on GUI 700 as a KBE.

Control 712 may be a user control. Control 712 may allow the user to view the System of Record. The System of Record may be the System of Record for the business element displayed on GUI 700.

Control 714 may be a user control. Control 714 may allow the user to change the System of Record.

Control 716 may be a user control. Control 716 may allow the user to view data lineage information. The data lineage information may correspond to the business element displayed on GUI 700.

Control 718 may be a user control. Control 718 may allow the user to view or edit criteria. The criteria may be access criteria. Control 718 may allow the user to generate a credential associated with a criterion.

Control 720 may be a user control. Control 720 may allow the user to view or edit options. The options may be notification options. The options may be customized.

Control 722 may be a user control. Control 722 may allow a user to view details. The details may be business element details. The business element details may correspond to the business element displayed on GUI 700.

FIG. 8 shows illustrative GUI 800.

GUI 802 may be accessed via control 722, discussed above in FIG. 7. GUI 802 may include details of one or more business elements. GUI 802 may include details of one or more business element identifiers.

GUI 800 may include heading 802.

GUI 800 may include column 804. Column 804 may display one or more identifiers. The identifier may be any suitable identifier, such as an alphanumeric identifier. The identifier may be associated with a business element.

GUI 800 may include element 806. Element 806 may be a business element identifier, such as "342," "421" or "273."

GUI 800 may include column 808. Information in column 808 may correspond to information in column 804. Column 808 may indicate if one or more of the business elements identified in column 804 are key business elements.

Column 808 may include element 810. Element 810 may indicate that business element ID number 342 corresponds to a key business element.

Column 808 may include element 812. Element 812 may indicate that business element ID number 421 does not correspond to a KBE.

GUI 800 may include column 814. Information in column 814 may correspond to information from column 808.

Column 814 may include element 816. Element 816 may be a KBE ID number. The KBE ID number of element 816 may be the same number as in element 806. The KBE ID number of element 816 be a different number than in element 806.

GUI 800 may include column 818. Column 818 may identify the System of Record for each business element ID number in column 804. For example, the system of record for business element ID number 342 may be mortgages 828. Mortgages 828 may be a server or database.

GUI 800 may include column 834. Column 834 may offer a user an option to configure a business element.

Column 834 may offer option 836. Option 836 may allow a user to designate a business element as a KBE.

Column 834 may offer option 838. Option 838 may allow a user to not designate a business element as a KBE.

GUI 800 may include controls 840, 842 and 844.

Control 840 may be a selectable link. Control 840 may link to an additional GUI. When selected, control 840 may allow a user to view access criteria for a business element.

Control 842 may be a selectable link. Control 842 may link to an additional GUI. When selected, control 842 may allow a user to view or modify notification options for a business element.

Control 844 may be a selectable link. Control 844 may link to an additional GUI. When selected, control 844 may allow a user to edit business element details.

Figure 9:
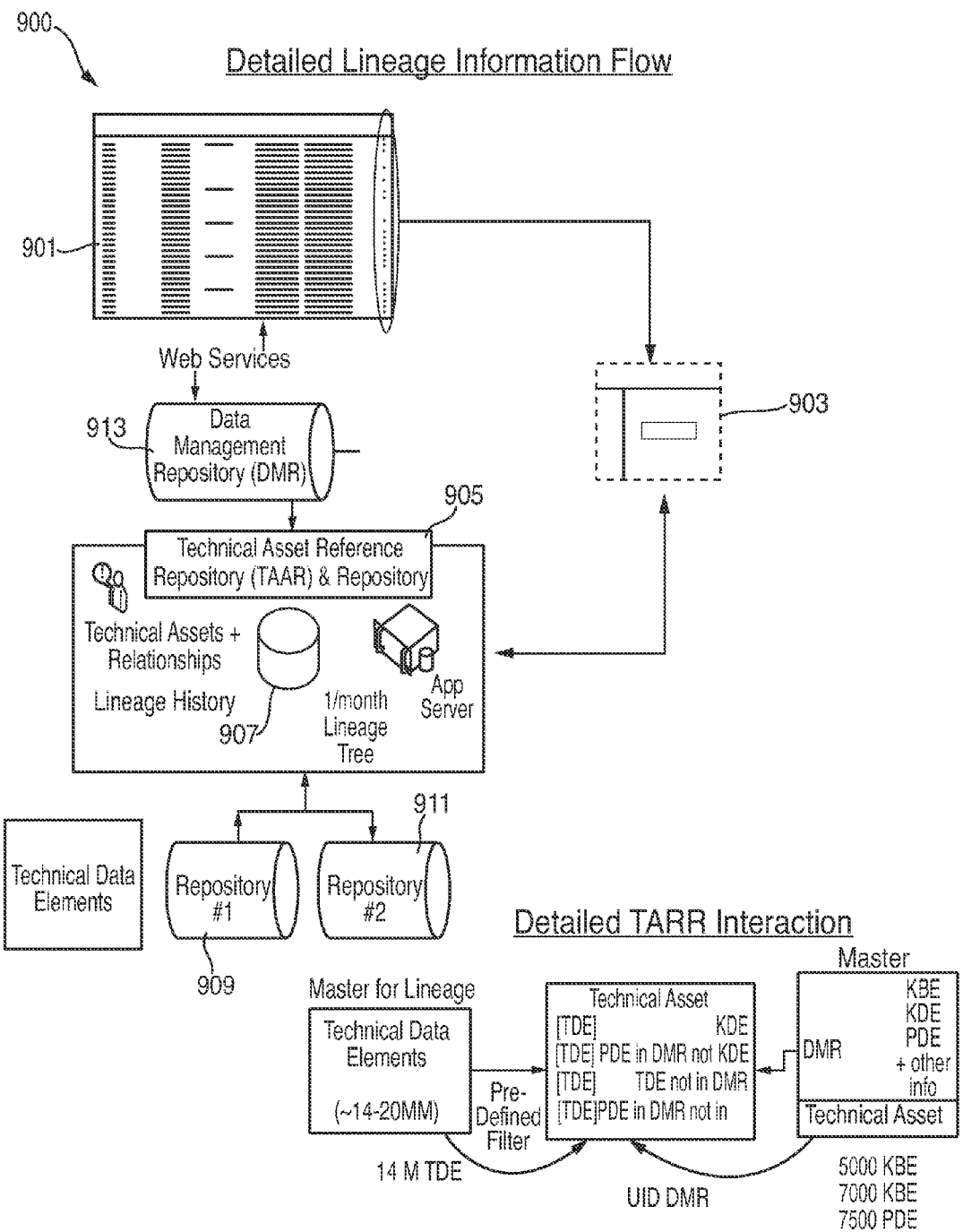
FIG. 9 shows an illustrative information flow in accordance with the principles of the invention.

FIG. 9 shows illustrative data lineage information flow in apparatus 900.

Apparatus 900 may display a user interface 901. User interface 901 may be a view or window within the metadata tool. User interface 901 may display a list of KBEs or KDEs. The list may be a list of KBEIs or KDEIs corresponding to a KBE or KDE. User interface 901 may also be operable with TDEs, TDEIs, terms, relationships and relationship dimensions. Each KBE or KDE may be associated with an icon. The icon may link to data lineage associated with the KBE or KDE. Each icon may link to a unique data lineage.

When the icon is clicked, apparatus 900 may be configured to open up browser 903. Browser 903 may be any suitable web browser. Browser 903 may open a unique URL associated with the KBE or KDE from user interface 901. Browser 903 may interface with a repository. The repository may be Technical Asset Repository ("TARR") 905.

TARR 905 may be a data repository. TARR may include metadata tool 907. Metadata tool 907 may be a database or application. TARR may further include technical assets and relationships.

Metadata tool 907 may interface with application discovery tools 909 and 911. Application discovery tools 909 and 911 may operate on a continuous basis. Application discovery tools 909 and 911 may continuously scan for data. The scanning may include data crawling. Application discovery tools 909 and 911 may document the interactions of all data within a system. The system may be all of the interconnected databases, applications, servers and networks of an institution. The institution may be a financial institution.

Examples of application discovery tools 909 and 911 may be ASG-becubic™, sold by ASG Software Solutions of Naples, Fla. Application discovery tools 909 and 911 may collect all data relationships and TDEs within a system. For TDEs not designated as KDEs, application discovery tools 909 and 911 may be designated as the provisioning point. Application discovery tools 909 and 911 may discover the location of each TDE, all related data, and the system of record for each TDE. However, it should be noted that application discovery tools 909 and 911 may be not merely index locations, but may be capable of processing the data to determine data lineage.

On a preconfigured time basis, TARR 905 may synchronize with application discovery tools 909 and 911. For example, the apparatus may be configured to update data lineage on a monthly basis. Once a month TARR 905 may synchronize all data with application discovery tools 909 and 911.

Metadata tool 907 may utilize the data TARR 905 received via synchronization with application discovery tools 909 and 911 to update the data lineage history of TDEs. The most recent data lineage tree may then be stored in TARR 905 to allow for lower lag time and ease of access. The storing of the most recent data lineage tree in TARR 905 may be particularly useful when a data lineage query is received. If a data lineage query is initiated, TARR 905 may pull the most recent documented lineage from the repository.

TARR 905 may be further configured to store the lineage change history of a TDE. Using browser 903, a user may initiate a query for a TDE. The user may then click for a drill down view of the data transformation. The user may request a view of data lineage changes from the current time in reference to a specified calendar date. The changes in lineage history may be highlighted. The changes may be retrieved from TARR 905.

TARR 905 may synchronize with Data Management Repository ("DMR") 913. Data Management Repository 913 may be a system of record. DMR 113 may automatically become the SOR for all KDEs. For example, a user may have authorization to designate a TDE as a KDE. The user may change the designation of the TDE within a database or system to a KDE. The SOR may be transferred to the DMR. The DMR may automatically become the SOR of all KDEs.

Different Lines of Business ("LOBs"), departments or operating units may designate a TDE as KDE. The units, LOBs or departments may be presented with a list of TDEs. The list of TDEs may be preselected to relate to the specific department. The department may then choose to designate certain TDEs as KDEs. The designation may change the SOR for the TDEs now designated as KDEs. The designation may change requirements and/or permissions associated with the KDEs.

An exemplary use of apparatus 900 may be as follows. A user may attempt to determine the data lineage of a KDE. The user may begin at user interface 901. The user may select a KDEI. The KDEI may correspond to a KDE. The user may click on the data lineage icon associated with the KDE. Upon clicking the icon, browser 903 may pop-up, displaying the associated data lineage of the KDE. The displayed data lineage may be retrieved by accessing TARR 905. TARR 905 may access metadata tool 907. Metadata tool 907 may have synchronized with DMR 913, indicating that the SOR for the data lineage of the KDE is DMR 913. TARR 905 may indicate the consumption point of the KDE.

In a further example, TARR 905 may indicate the SOR for a TDE.

Figure 10:
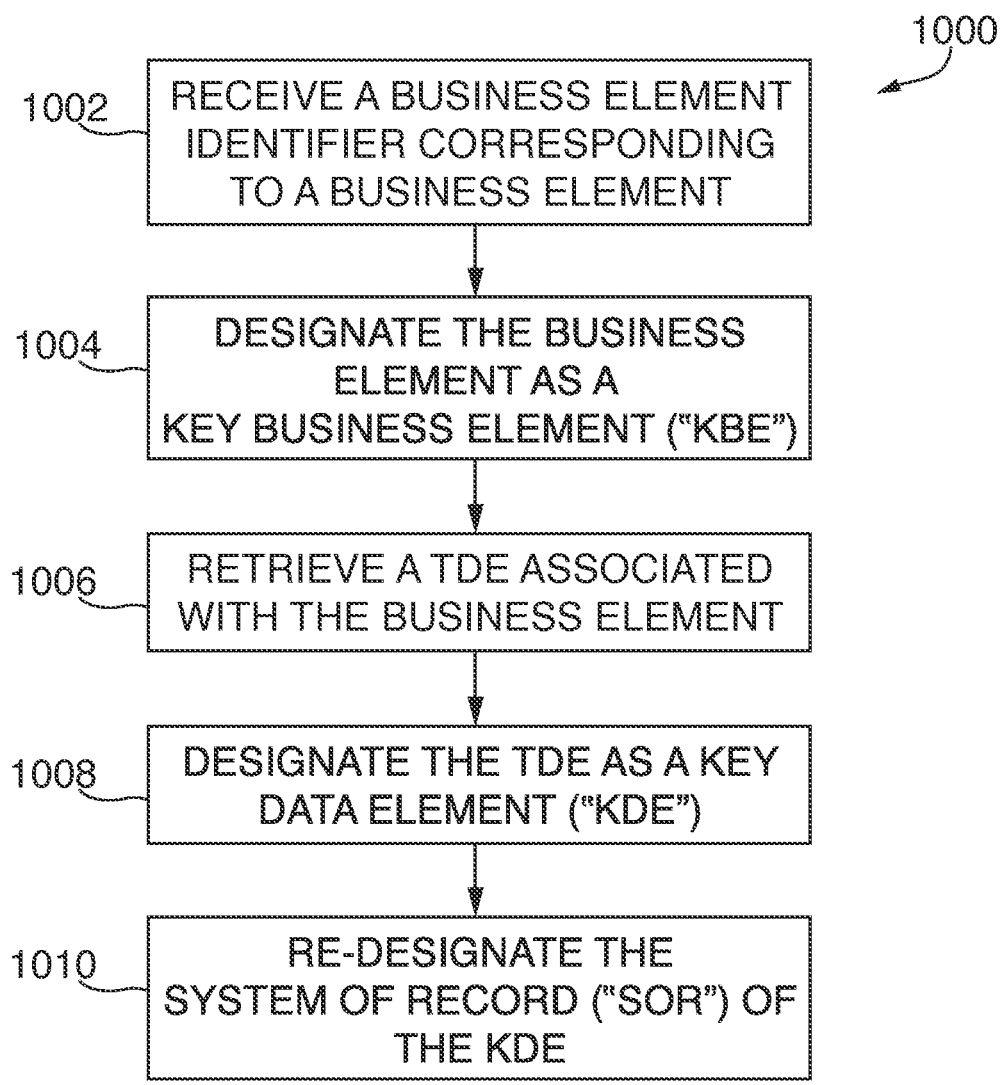
FIG. 10 shows illustrative steps of another process in accordance with the principles of the invention.

FIG. 10 shows illustrative process 1000. Process 1000 may begin at step 1002. At step 1002, the system may receive an identifier. The identifier may be an element identifier. The element identifier may be a business element identifier. The business element identifier may correspond to a business element.

At step 1004, the system may designate the business element as a key business element.

At step 1006, the system may retrieve a TDE. The system may retrieve a TDE identifier. The TDE identifier may be associated with the business element identifier. The TDE identifier may correspond to a TDE. The TDE may be associated with the business element.

At step 1008, the system may designate the TDE as a key data element ("KDE").

At step 1010, the system may re-designate the system of record. The system of record may be the system of record of the KDE.

Figure 11:
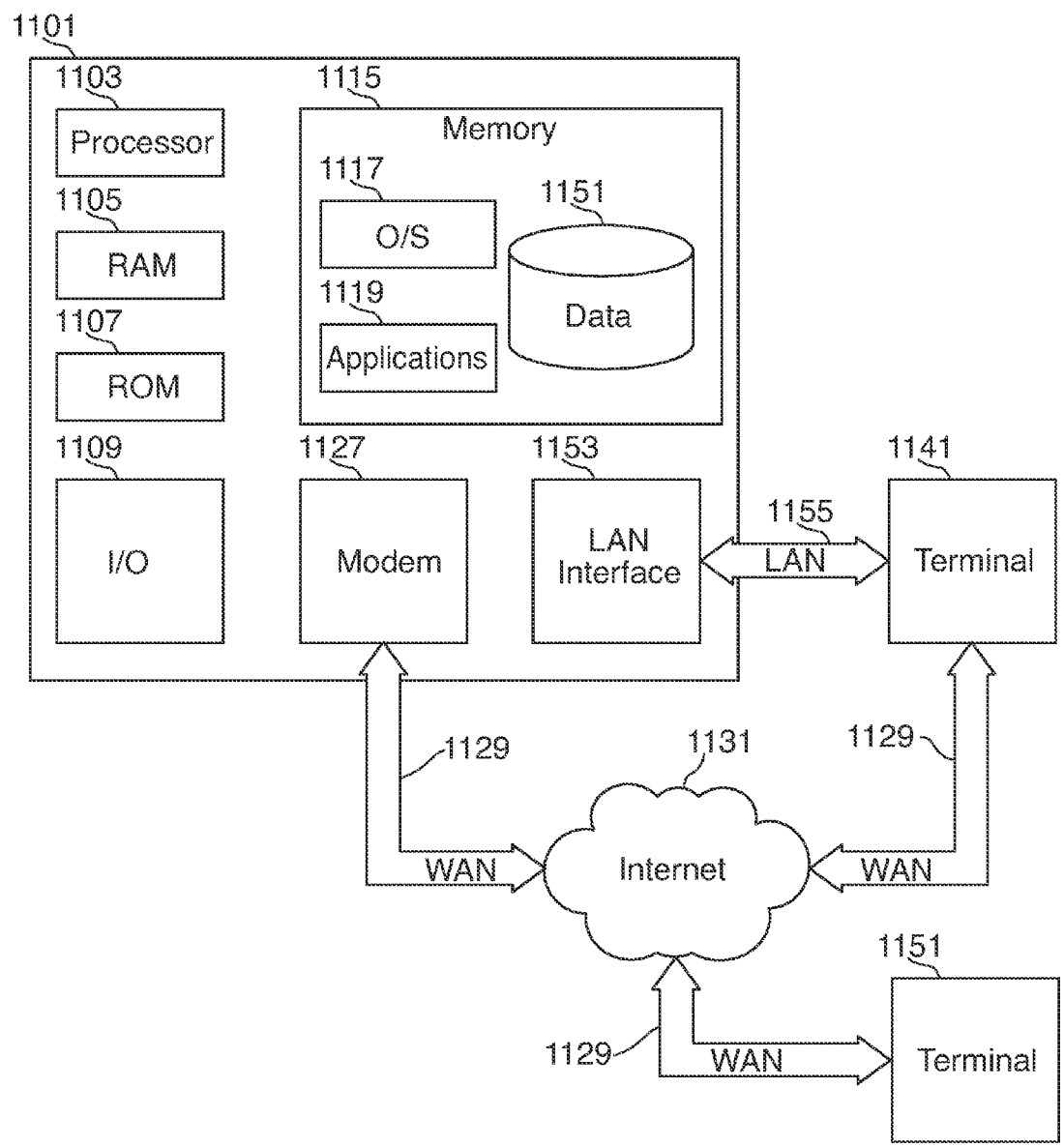
FIG. 11 shows other illustrative apparatus in accordance with the principles of the invention.

FIG. 11 illustrates a computing device 1101 (alternatively referred to herein as a "server") that may be used according to an illustrative embodiment of the invention. The computer server 1101 may have a processor 1103 for controlling overall operation of the server and its associated components, including RAM 1105, ROM 1107, input/output ("I/O") module 1109, and memory 1115.

I/O module 1109 may include a microphone, keypad, touch screen and/or stylus through which a user of device 501 may provide input, and may also include one or more of a speaker for providing audio output and a video display device for providing textual, audiovisual and/or graphical output. Software may be stored within memory 1115 and/or other storage (not shown) to provide instructions to processor 1103 for enabling server 1101 to perform various functions. For example, memory 1115 may store software used by server 1101, such as an operating system 1117, application programs 1119, and an associated database 1111. Alternatively, some or all of server 1101 computer executable instructions may be embodied in hardware or firmware (not shown).

Server 1101 may operate in a networked environment supporting connections to one or more remote computers, such as terminals 1141 and 1151. Terminals 1141 and 1151 may be personal computers or servers that include many or all of the elements described above relative to server 1101. The network connections depicted in FIG. 11 include a local area network (LAN) 1125 and a wide area network (WAN) 1129, but may also include other networks. When used in a LAN networking environment, computer 1101 is connected to LAN 1125 through a network interface or adapter 1113. When used in a WAN networking environment, server 1101 may include a modem 1127 or other means for establishing communications over WAN 1129, such as Internet 1131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 1119, which may be used by server 1101, may include computer executable instructions for invoking user functionality related to communication, such as email, short message service (SMS), and voice input and speech recognition applications.

Computing device 1101 and/or terminals 1141 or 1151 may also be mobile terminals including various other components, such as a battery, speaker, and antennas (not shown). Terminal 1151 and/or terminal 1141 may be portable devices such as a laptop, tablet, smartphone or any other suitable device for storing, transmitting and/or transporting relevant information.

Any information described above in connection with database 1111, and any other suitable information, may be stored in memory 1115. One or more of applications 1119 may include one or more algorithms that may be used to generate data lineage, render lineage information, generate controls, prioritize controls and/or any other suitable tasks.

Figure 12:
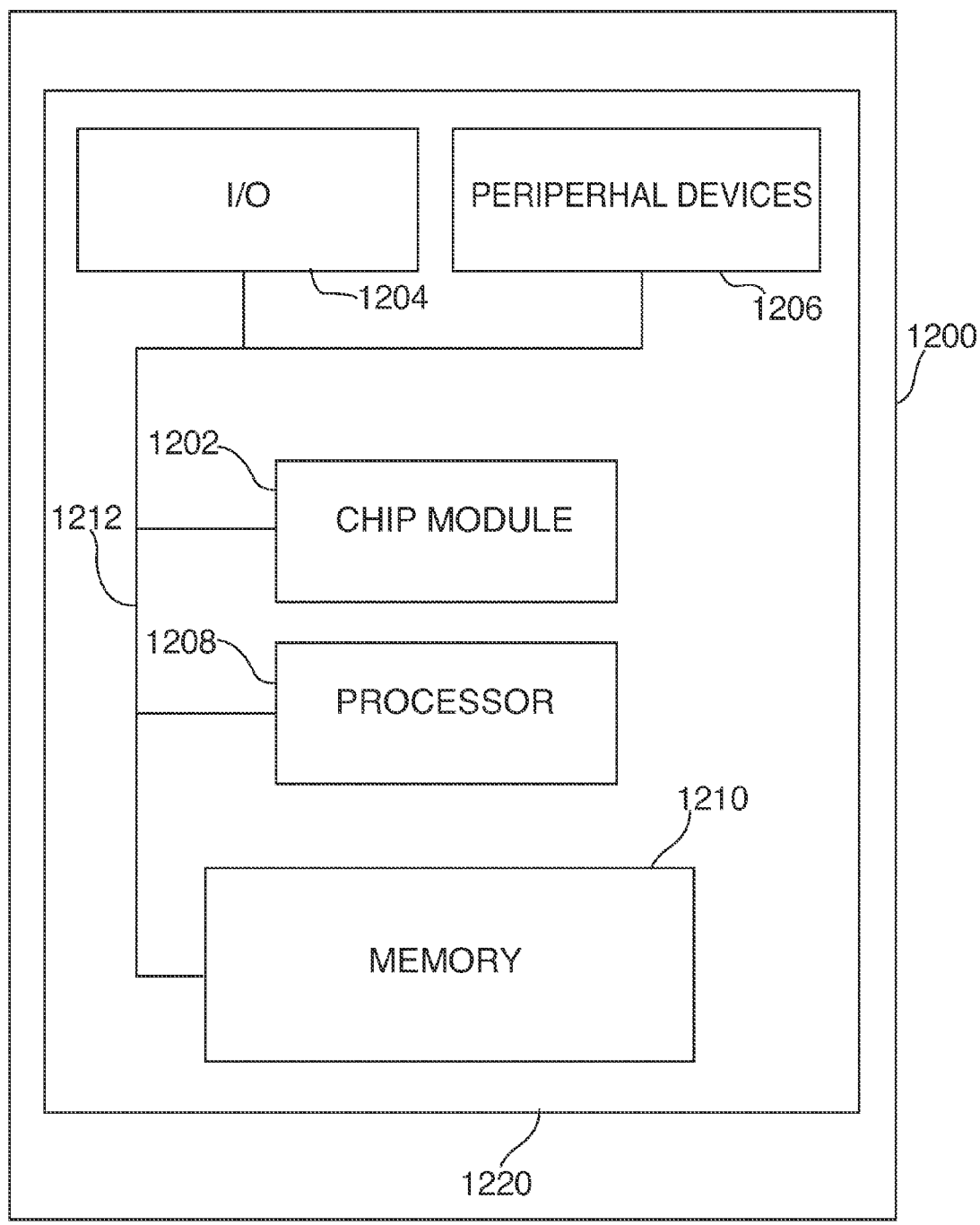
FIG. 12 shows still other illustrative apparatus in accordance with the principles of the invention.

FIG. 12 shows an illustrative apparatus that may be configured in accordance with the principles of the invention.

FIG. 12 shows illustrative apparatus 1200. Apparatus 1200 may be a computing machine. Apparatus 1200 may be included in apparatus shown in FIG. 11. Apparatus 1200 may include chip module 1202, which may include one or more integrated circuits, and which may include logic configured to perform any other suitable logical operations.

Apparatus 1200 may include one or more of the following components: I/O circuitry 1204, which may include the transmitter device and the receiver device and may interface with fiber optic cable, coaxial cable, telephone lines, wireless devices, PHY layer hardware, a keypad/display control device or any other suitable encoded media or devices; peripheral devices 1806, which may include counter timers, real-time timers, power-on reset generators or any other suitable peripheral devices; logical processing device 1208, which may compute data structural information, structural parameters of the data, quantify indicies; and machine-readable memory 1210.

Machine-readable memory 1210 may be configured to store in machine-readable data structures: data lineage information; data lineage, technical data elements; data elements; business elements; identifiers; associations; relationships; and any other suitable information or data structures.

Components 1202, 1204, 1206, 1208 and 1210 may be coupled together by a system bus or other interconnections 1212 and may be present on one or more circuit boards such as 1220. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 1200 may operate in a networked environment supporting connections to one or more remote computers via a local area network (LAN), a wide area network (WAN), or other suitable networks. When used in a LAN networking environment, apparatus 1200 may be connected to the LAN through a network interface or adapter in I/O circuitry 1204. When used in a WAN networking environment, apparatus 1200 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate logical processing device 1208, for example over the Internet.

Apparatus 1200 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Figure 13:
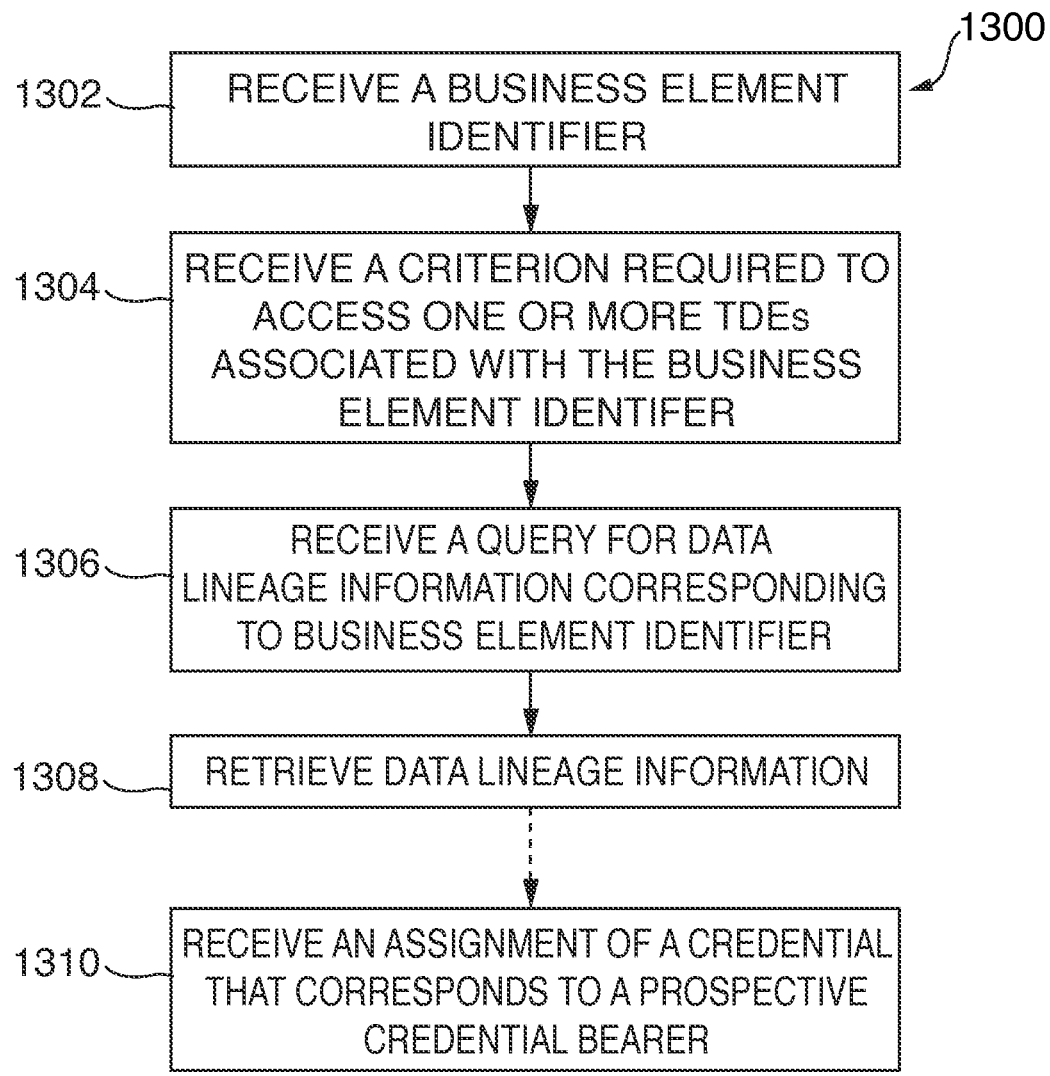
FIG. 13 shows illustrative steps of still another process in accordance with the principles of the invention.

FIG. 13 shows illustrative process 1300. Process 1300 may be a process for configuring a tool. The tool may be a security tool. The security tool may be a role-based security tool.

Process 1300 may begin at step 1302. At step 1302, the system may receive an identifier. The identifier may be a business element identifier.

At step 1304, the system may receive a criterion. The criterion may be a criterion required to access one or more TDEs. The TDEs may be associated with a business element identifier.

At step 1306, the system may receive a query. The query may be a query for information. The information may be data lineage information. The data lineage information may correspond to an identifier. The identifier may be a business element identifier.

At step 1308, the system may retrieve information. The information may be data lineage information. The data lineage information may be data lineage information corresponding to the business element identifier. The business element identifier may correspond to a business element.

At step 1310, the system may receive an assignment. The assignment may be an assignment of a credential. The credential may correspond to a bearer. The bearer may be a prospective bearer. The prospective bearer may be a prospective credential bearer.

Figure 14:
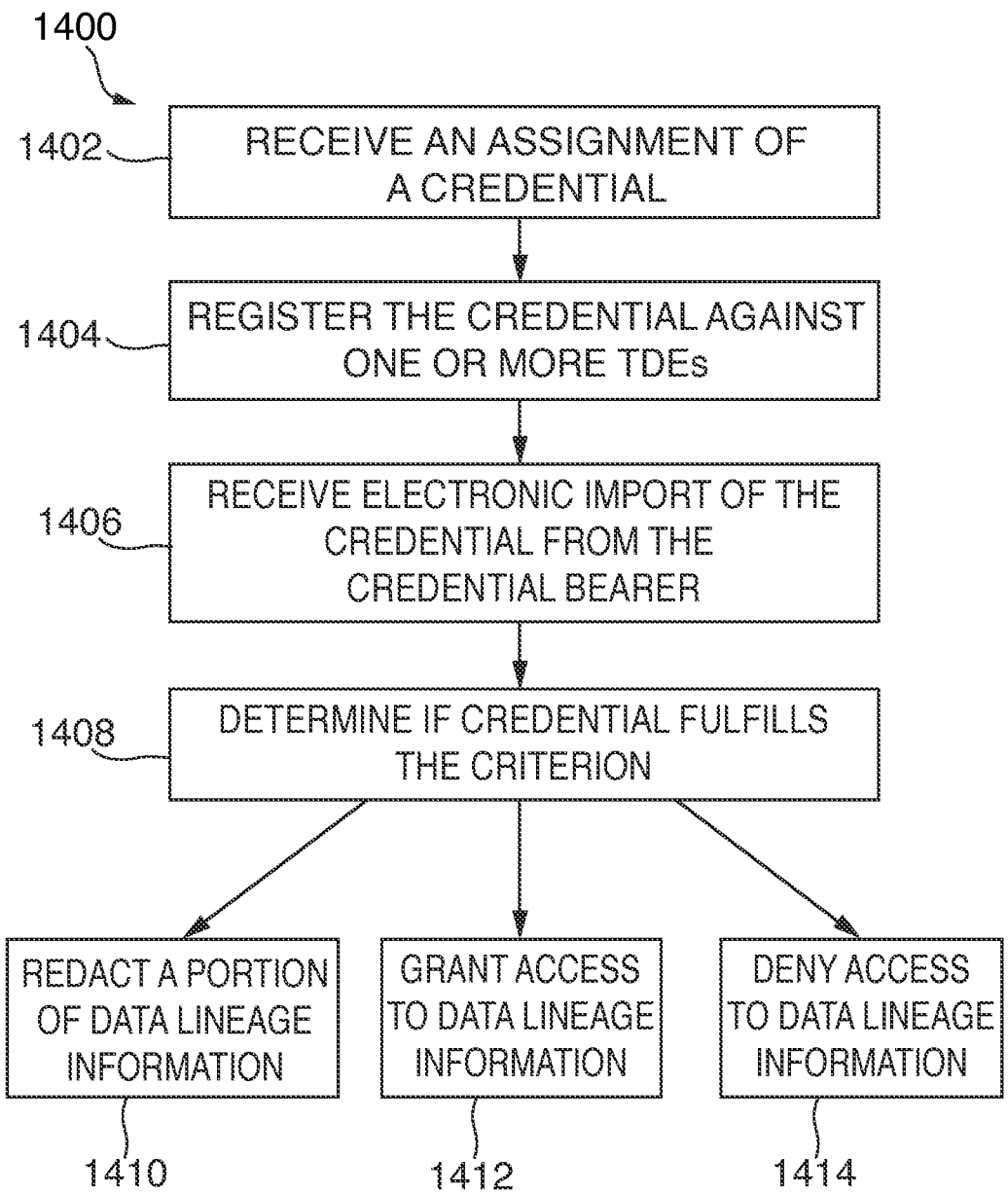
FIG. 14 shows illustrative steps of yet another process in accordance with the principles of the invention.

FIG. 14 shows illustrative process 1400.

Process 1400 may begin at step 1402. At step 1402, the system may receive an assignment. The assignment may be an assignment of a credential.

At step 1404, the system may register the credential. The credential may be registered against an element. The element may be a business element. The element may be a TDE. The element may be a KDE.

At step 1406, the system may receive an import. The import may be an electronic import. The electronic import may be an electronic import of a credential. The credential may be imported from a bearer. The bearer may be a credential bearer.

At step 1408, the system may make a determination. The system may determine if a criterion is fulfilled. The system may determine if a credential has fulfilled the criterion.

The process may continue at one or more of steps 1410, 1412 and 1414. The continuation of the process at one or more of steps 1410, 1412 and 1414 may depend on the determination at step 1408.

At step 1408, the system may determine that the credential fulfills the criterion. The process may then proceed to step 1410. The process may alternatively proceed to step 1412.

At step 1410, the system may redact information. The information may be data lineage information. Some of the data lineage information may be redacted. Some of the data lineage information may not be redacted.

At step 1412, the system may grant access to data lineage information. The data lineage information may correspond to a TDE. The data lineage information may correspond to a business element.

At step 1408, the system may determine that a credential does not fulfill the criterion. The process may proceed to step 1410. The process may alternatively proceed to step 1414.

At step 1410, the system may redact some or all of the data lineage information.

At step 1414, the system may deny access. The system may deny access to data lineage information.

Figure 15:
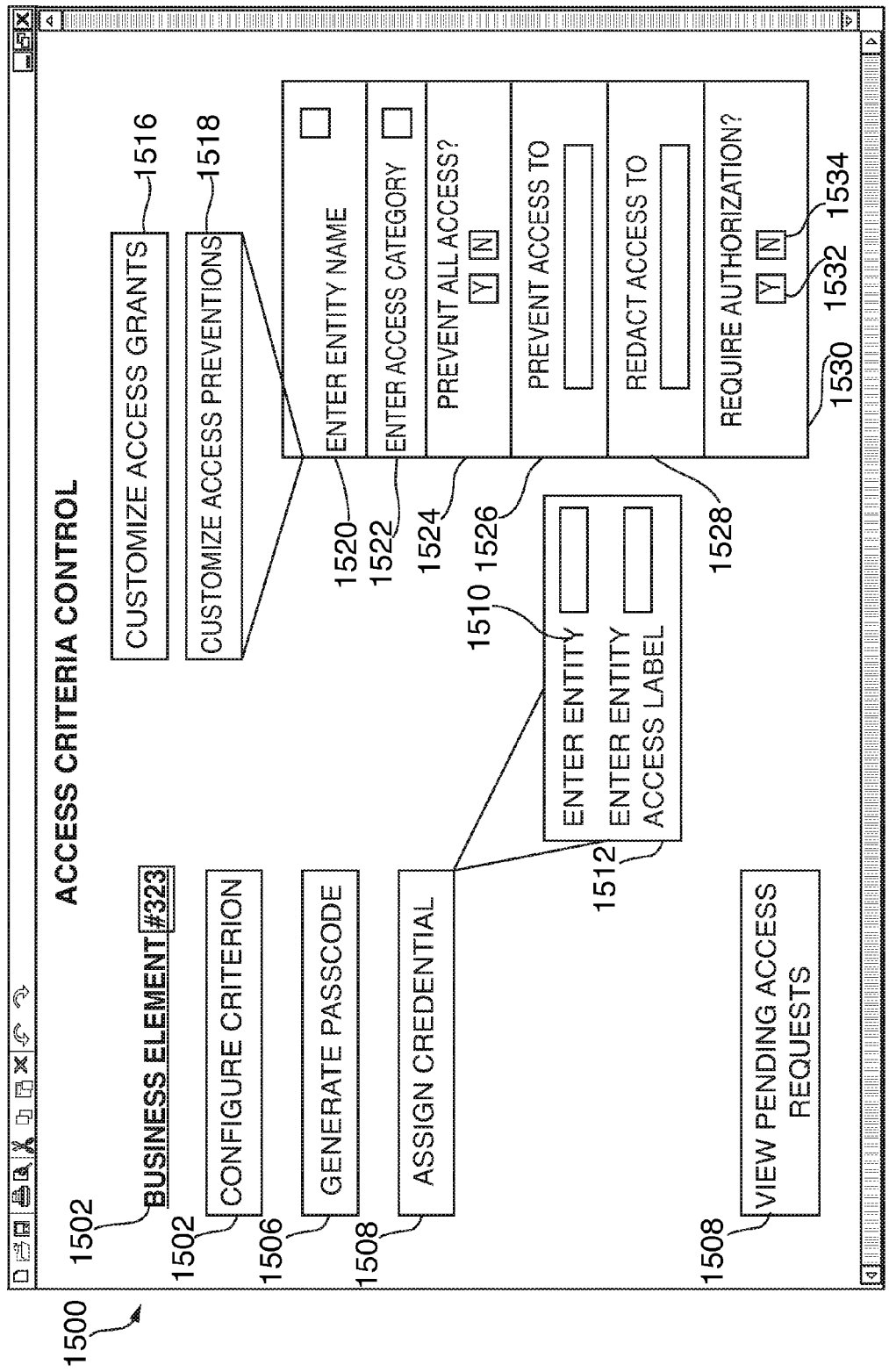
FIG. 15 shows yet other illustrative information in accordance with the principles of the invention.

FIG. 15 shows illustrative GUI 1500. GUI 1500 may be a display of a control. The control may be an access control. The access control may be one or more access criteria control. The access criteria control may be a control to access data lineage information.

The data lineage information may be associated with a business element.

GUI 1500 may include business element identifier 1502. Business element identifier 1502 may correspond to a business element.

GUI 1500 may display one or more controls 1504, 1506, 1508, 1510, 1512, 1514, 1516, 1518, 1520, 1522, 1524, 1526, 1528, 1530, 1532, 1534 and 1536, referred to alternatively hereinafter as "the controls."

One or more of the controls may be selectable. One or more of the controls may be a link. The link may be clickable. The controls may link to one or more additional GUIs. The controls may allow a user to modify, edit or customize one or elements.

Control 1504 may be selected by a user. Upon selection, control 1504 may allow the user to configure a criterion. The criterion may be an access criterion.

Control 1506 may be selected by a user. Upon selection, control 1506 may allow the user to generate a passcode. The passcode may be a credential. The passcode may be assigned to one or more entities. The passcode may be any suitable passcode.

Control 1508 may be selected by a user. Upon selection, control 1508 may allow the user to assign a credential. The credential may be assigned to one or more entities. The credential may correspond to one or more access criteria.

Control 1508 may further include controls 1510 and 1512. Controls 1510 and 1512 may be options for assigning a credential.

Control 1510 may allow a user to enter an entity. The entity may be any suitable entity. Control 1512 may allow a user to enter a label. The label may be an access label. The access label may be an access label for an entity. The access label may correspond to security access label. Exemplary labels may include confidential, public, private or any other suitable label.

Control 1514 may be selected by a user. Upon selection, control 1514 may allow the user to view pending access requests. The access requests may be input by an entity. The entity may request permission to view or modify data lineage information. The entity may be prevented from viewing or modifying data lineage until permission is granted by a party authorized to grant the permission.

Control 1516 may be selected by a user. Upon selection, control 1516 may allow the user to customize a grant. The grant may be a grant of access. The access may be access to data lineage information. The access may be access to view, modify, edit or otherwise utilize data lineage information. The access grant may be granted to an entity or server. The access may be granted as a credential.

Control 1518 may be selected by a user. Upon selection, control 1518 may allow the user to customize a prevention. The prevention may be an access prevention. The access prevention may prevent a user, server, or any other suitable entity from one or more of accessing, viewing, modifying, editing or otherwise utilizing data lineage information.

Controls 1516 and 1518 may be further customized using one or more of controls 1520, 1522, 1524, 1526, 1528, 1530, 1532 and 1534. Controls 1520, 1522, 1524, 1526, 1528, 1530, 1532 and 1534 may be opened in one or more additional GUIs.

Control 1520 may be selected by a user. Upon selection, control 1520 may allow the user to enter an entity name.

Control 1522 may be selected by a user. Upon selection, control 1522 may allow the user to enter an access category. The access category may be any suitable access level. The access category may be an access label substantially similar to those discussed in control 1512.

Control 1524 may be selected by a user. Upon selection, control 1524 may allow the user to prevent an entity from accessing all data lineage information.

Control 1526 may be selected by a user. Upon selection, control 1526 may allow the user to specify access. The user may specify data lineage information for which access may be granted. The user may specify data lineage information for which access may be prevented.

The user may specify functions that may be granted. Exemplary functions may include accessing, viewing, modifying, editing or otherwise utilizing data lineage information. The user may specify functions that may be prevented. Exemplary functions may include accessing, viewing, modifying, editing or otherwise utilizing data lineage information.

Control 1528 may be selected by a user. Upon selection, control 1528 may allow the user to redact access to data lineage information.

Control 1530 may be selected by a user. Upon selection, control 1530 may allow the user to require authorization. The authorization may be prior authorization. The authorization may be authorization for one or more data lineage information functions.

Figure 16:
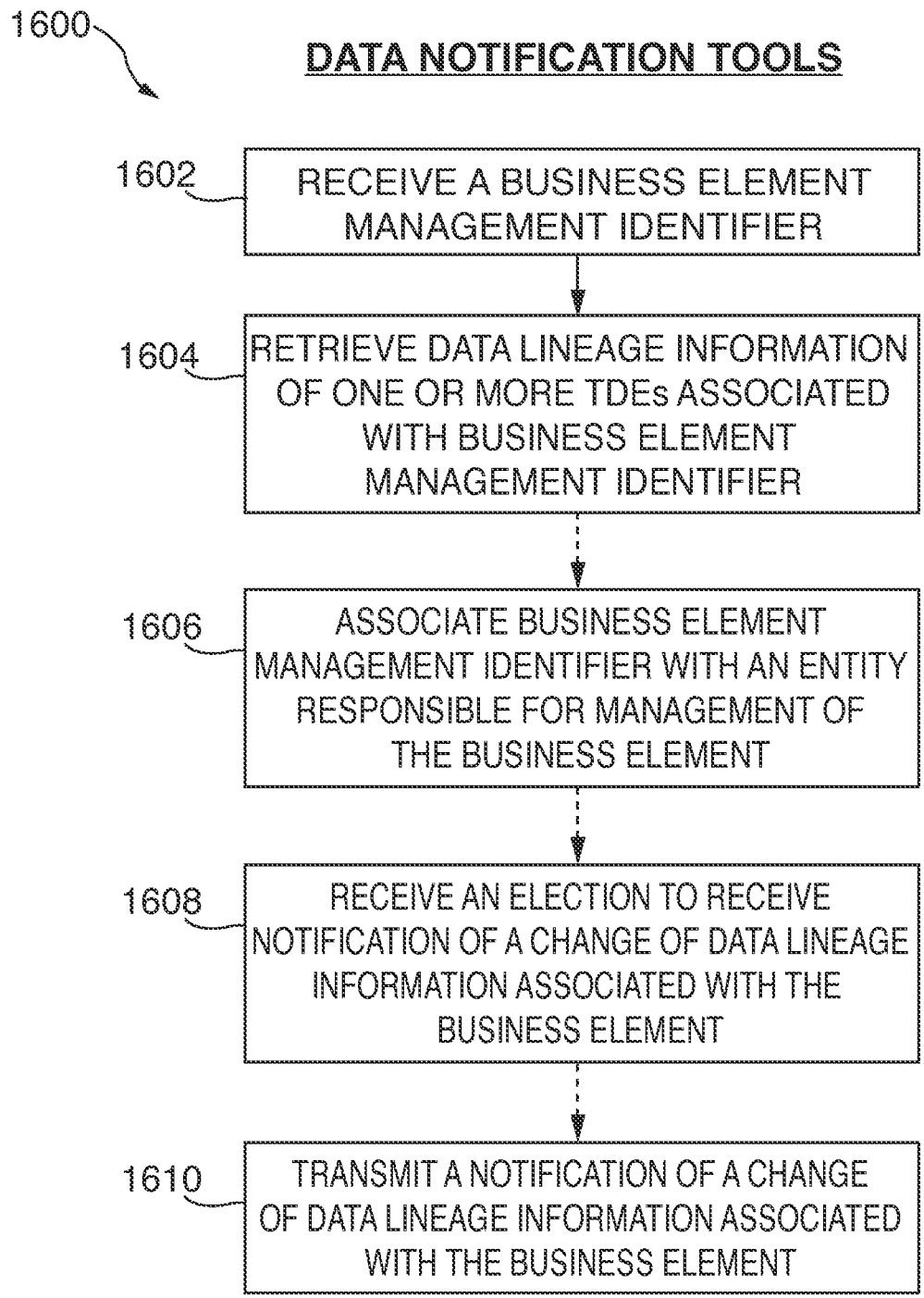
FIG. 16 shows illustrative steps of yet another process in accordance with the principles of the invention.

FIG. 16 shows illustrative process 1600. Process 1600 may be a process for configuring a tool. The tool may be a notification tool. The tool may be a data notification tool.

Process 1600 may begin at step 1602.

At step 1602, the system may receive an identifier. The identifier may be a management identifier. The management identifier may correspond to an element. The element may be a business element. The business element management identifier may correspond to an entity. The entity may be responsible for management of the business element. The entity may grant or deny authorization and access to data lineage information corresponding to the business element. The business element management identifier may correspond to a server, database or system.

At step 1604, the system may retrieve data lineage information. The data lineage information may be data lineage information of one or more TDEs. The TDEs may be associated with one or more TDE identifiers ("TDEIs"). The TDEIs may be associated with a business element management identifier.

At step 1606, the system may associate a business element management identifier with an entity. The entity may be an entity responsible for management of the business element.

At step 1608, the system may receive an election. The election may be an election to receive a notification. The notification may be a notification of a change. The change may be a change of data lineage information. The data lineage information may be associated with a business element.

At step 1610, the system may transmit a notification. The notification may be a notification of a change. The notification may be transmitted based on the election to receive a notification. The change may be a change of data lineage information. The data lineage information may be associated with a business element.

FIG. 17 shows illustrative GUI 1700. GUI 1700 may allow a user to customize notification options. The notification options may be notification options related to data lineage information.

GUI 1700 may include controls 1702, 1704 and 1706. Controls 1702, 1704 and 1706 may allow a user to customize notifications.

Control 1702 may allow a user to configure a notification. The notification may be a new notification. The notification may be a notification for a business element. The notification may be a notification for a business element with one or more notifications that are already configured. The notification may be a first notification for a business element.

Control 1704 may allow a user to edit notifications.

Control 1706 may allow a user to view all notifications. The notifications may be all enabled notifications. The notifications may include notifications that have been customized, but are currently disabled or suspended.

GUI 1700 may include heading 1708. Heading 1708 may show current notification settings.

GUI 1708 may include columns 1710, 1712, 1714, 1716, 1718 and 1720.

Column 1710 may display a business element identifier. The business element identifier may correspond to a business element. The business element may be associated with notification settings. The notification settings may correspond to one or more notification requests. The notification request may be a request for information about data lineage information. The data lineage information may correspond to a business element.

Column 1712 may display an administrator or manager. The administrator or manager may be an individual, entity, server, database, system or any suitable administrator or manager. The administrator or manager may be responsible for a business element.

Column 1714 may include controls. The controls may be notification customization controls. A user may select to receive notifications for a business element. A user may decline to receive notifications for a business element.

Column 1716 may display frequency. The frequency may indicate the frequency of notifications. The frequency may be customized to any suitable time frame.

Column 1718 may display notification type. The notification type may indicate a type of data lineage information change. The type of data lineage information may be data lineage information changes for which notifications are requested.

Column 1720 may display a source of data lineage information change. The source may be one or more users. The source may be a server, computer, database or system.

GUI 1700 may include controls 1722 and 1724. Control 1722 may allow a user to customize data lineage information notifications. Control 1724 may allow a user to edit notifications.

Figure 18:
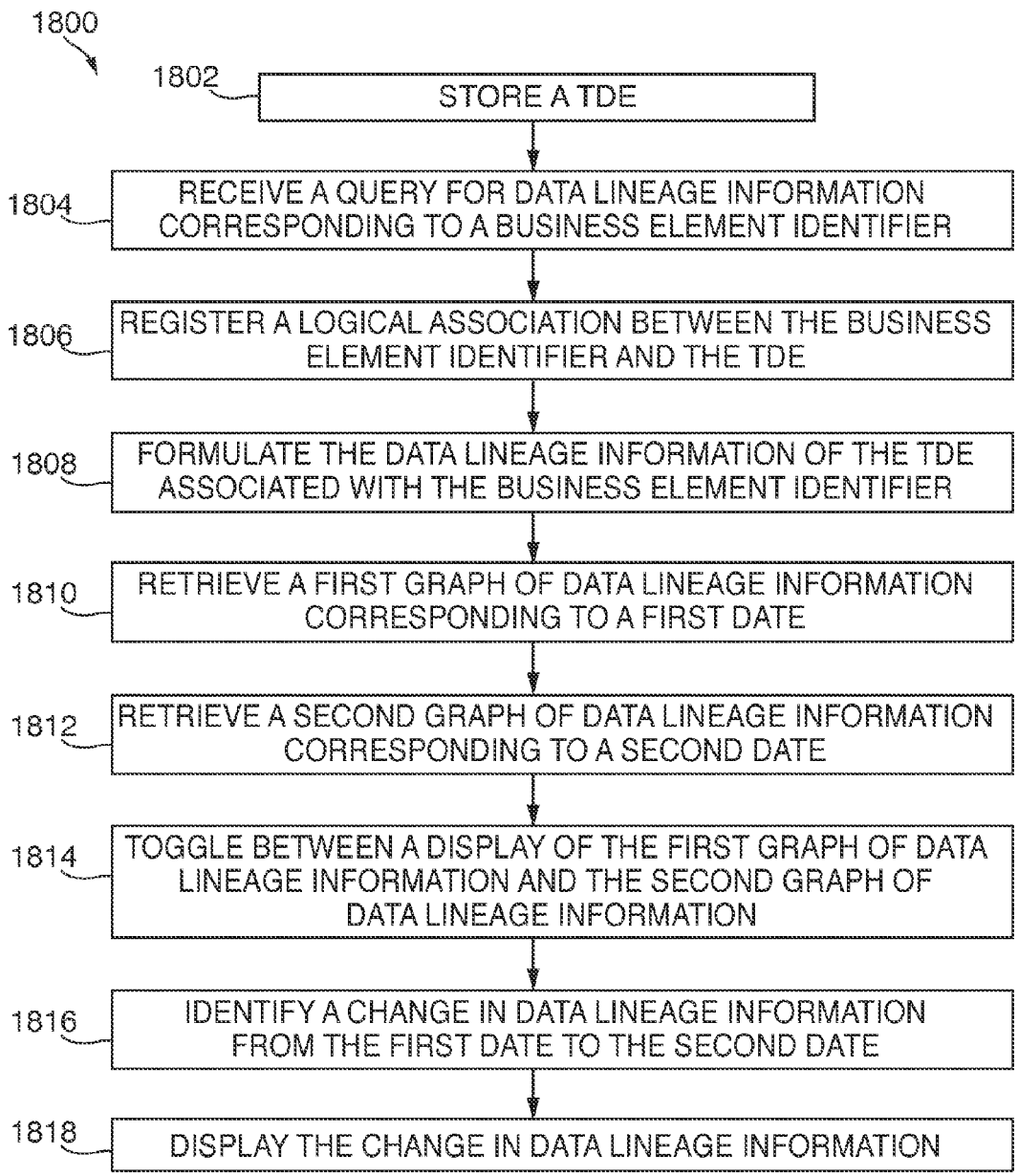
FIG. 18 shows illustrative steps of yet another process in accordance with the principles of the invention.

FIG. 18 shows illustrative process 1800. Process 1800 may be a process for analysis. The analysis may be data analysis. The analysis may be data lineage information analysis. The data lineage information analysis may be temporal analysis.

Process 1800 may begin at step 1802.

At step 1802, the system may store a data element. The data element may be a TDE.

At step 1804, the system may receive a query. The query may be a query for data lineage information. The data lineage information may correspond to an identifier. The identifier may be a business element identifier. The identifier may be a TDE identifier.

At step 1806, the system may register an association. The association may be a logical association. The association may be an association between the business element identifier and the TDE identifier.

At step 1808, the system may formulate information. The information may be data lineage information. The data lineage information of the TDE. The TDE may be associated with a TDEI. The TDEI may be associated with the business element identifier.

At step 1810, the system may retrieve a graph. The graph may be a first graph. The graph may be a graph of data lineage information. The data lineage information may correspond to data lineage information on a date. The date may be a first date.

At step 1812, the system may retrieve a graph. The graph may be a second graph. The graph may be a graph of data lineage information. The data lineage information may correspond to data lineage information on a date. The date may be a second date.

At step 1814, the system may toggle between a display. The display may be a display of a first graph. The display may be a display of a second graph. The system may toggle between a display of the first graph and the second graph.

At step 1816, the system may identify a change. The change may be a change in data lineage information. The change may be a change to the data lineage information from a first date to a second.

At step 1818, the system may display a change. The change may be a change in data lineage information.

Figure 19:
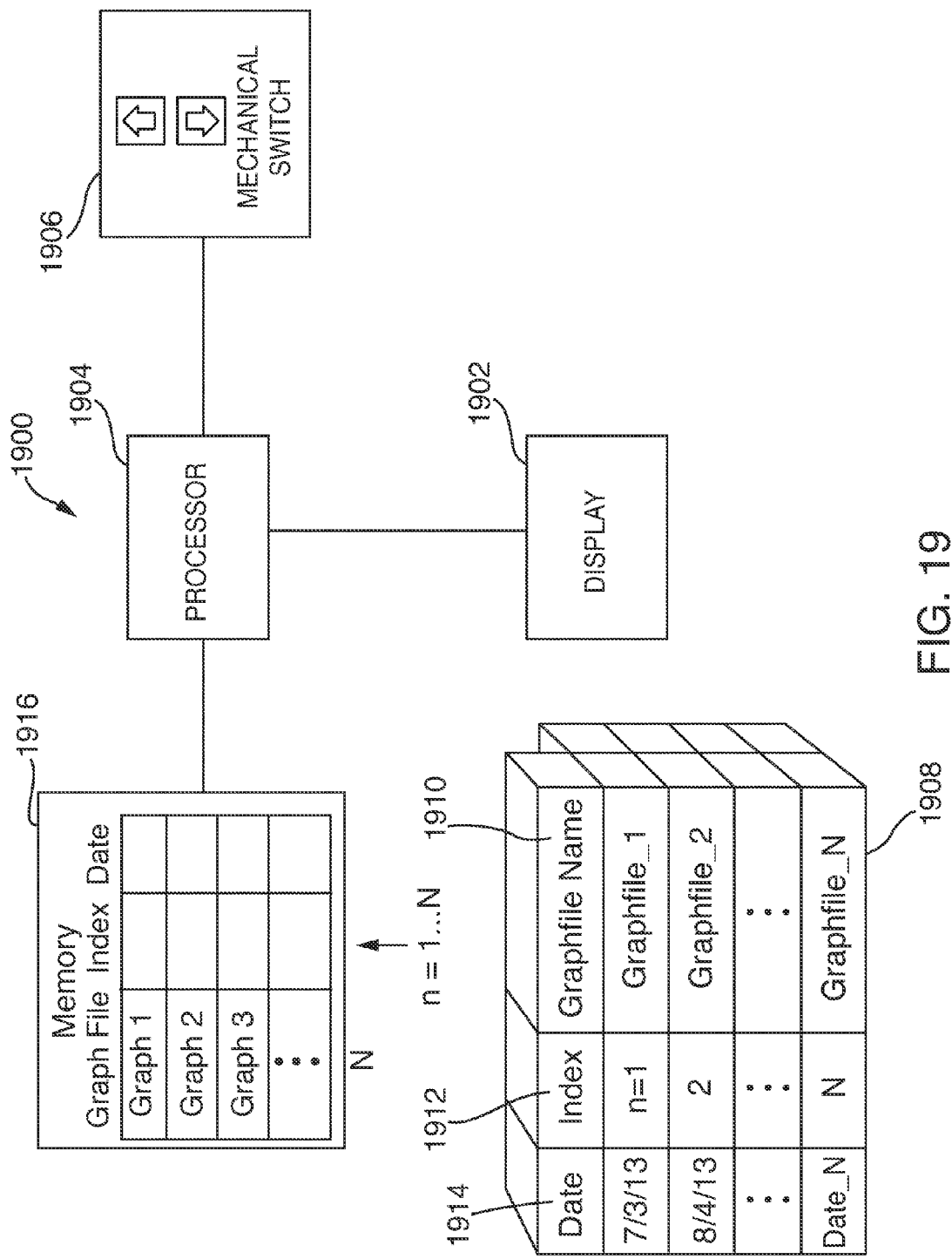
FIG. 19 shows yet other illustrative information along with apparatus in accordance with the principles of the invention.

FIG. 19 shows illustrative apparatus 1900.

Apparatus 1900 may enable a system or user to toggle between one or more graphs.

Apparatus 1900 may include display 1902. Display 1902 may be a GUI. Display 1902 may be a graph. Display 1902 may be a screen.

Display 1902 may display a graph. Display 1902 may receive the graph via processor 1904.

Processor 1904 may transmit a signal. Processor 1904 may receive a signal. The signal may be received from mechanical switch 1906.

Mechanical switch 1906 may be any suitable mechanical switch. Mechanical switch 1906 may transmit a signal to processor 1904. The signal may be a signal to toggle a display. The signal may be a signal to toggle a display between a first graph and a second graph.

Processor 1904 may retrieve a graph from 1916. Memory 1916 may be physical memory. Memory 1916 may include a first graph file. Memory 1916 may include a second graph file.

Memory 1916 may include graphfile name 1910, index 1912 and date 1914.

Graphfile name 1910 may be an identifier. The identifier may be a label. The identifier may correspond to the existence of physical graph data 1908.

Index 1912 may be an identifier or label. Index 1912 may be a numerical identifier.

Date 1914 may be an identifier or label. Date 1914 identify a date associated with graphfile name 1910. Date 1914 may be associated with graph data 1908.

Figure 20:
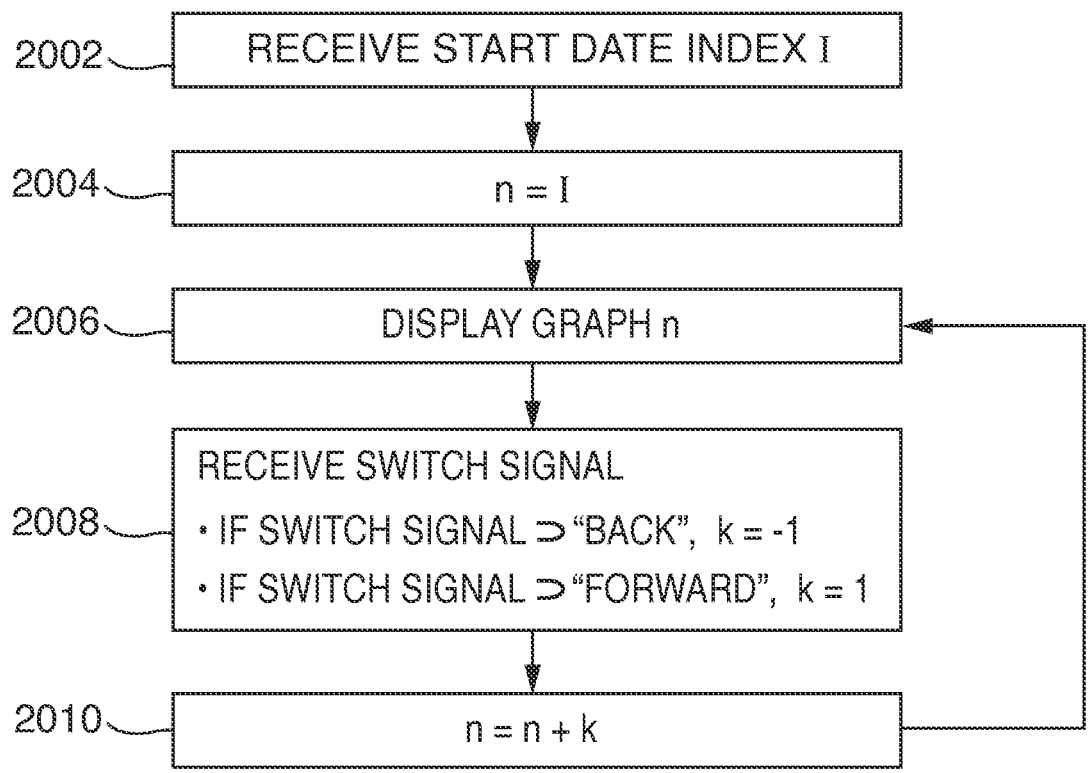
FIG. 20 shows illustrative steps of yet another process in accordance with the principles of the invention.

FIG. 20 shows illustrative process 2000. Process 2000 may be a process for toggling between one or more graphs.

Process 2000 may begin at step 2002.

At step 2002, the system may receive an index. The index may be a date index. The date index may be a start date index. The start date index may be assigned an initial value. The initial value may be any suitable value. The initial value may be identified as "I."

At step 2004, the system may define a variable. The variable may be variable "n." Variable n may correspond to value "I."

At step 2006, the system may display a graph. The graph may a graph corresponding to the value of variable "n>'

At step 2008, the system may receive a signal. The signal may be a switch signal. The system may determine if the switch signal corresponds to one movement back. The system may determine if the switch signal corresponds to one movement forward.

If the switch signal corresponds to one movement back, the system may configure variable "k" as "−1." If the switch signal corresponds to one movement forward, the system may configure variable "k" as "1."

At step 2010, the system may determine the value of n. The value of n may correspond to a graphfile. The graphfile may be a physical file. The value of n may correspond to the graphfile to be displayed.

The value of n may equal the sum of the value of n from step 2004 and the value of k from step 2010.

The system may take the sum from step 2010 and display the graph corresponding to the sum.

Figure 21:
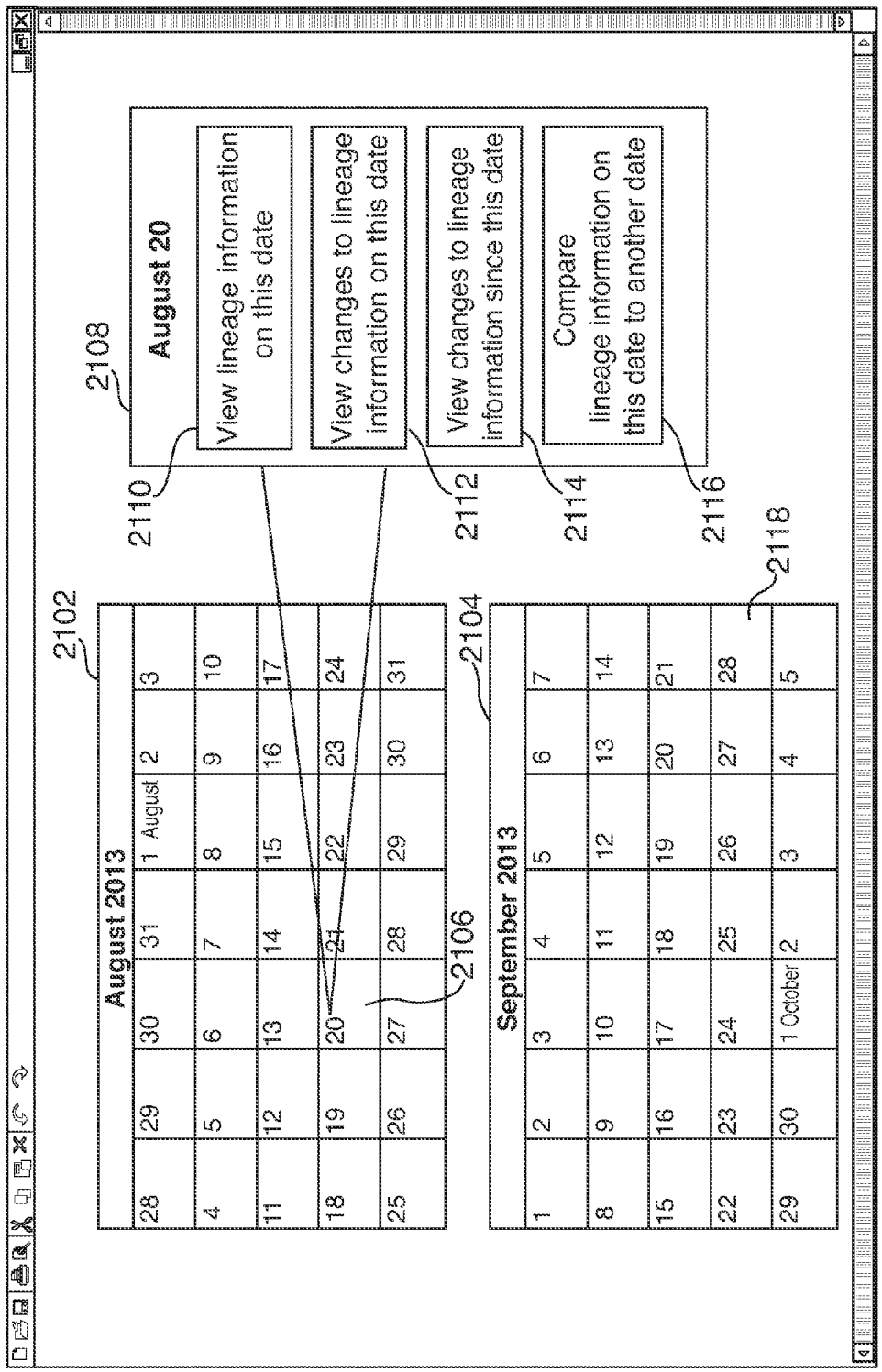
FIG. 21 shows yet other illustrative information in accordance with the principles of the invention.

FIG. 21 shows illustrative GUI 2100. GUI 2100 may display data lineage information history. The data lineage information history may be displayed in a calendar view. The calendar view may correspond to data lineage information changes made across time. The changes may result from a comparison. The comparison may be a comparison of data lineage information from two calendar dates.

GUI 2100 may include calendars 2102 and 2104. Calendar 2102 may display a calendar. Calendar 2102 may include a selectable date, such as date 2106.

Upon selecting date 2106, a user may view data lineage information from that date. The lineage information may be displayed as it existed on date 2106.

The user may be presented with toolbox 2108. Toolbox 2108 may enable a user to perform one or more functions. Toolbox 2108 may include controls 2110, 2112, 2114 and 2116.

Control 2110 may allow a user to view lineage information as it existed on date 2106.

Control 2112 may allow a user to view changes to lineage information that occurred on date 2106.

Control 2114 may allow a user to view some or all changes to lineage information. The changes may be changes to lineage information since date 2106.

Control 2116 may allow a user to compare lineage information. Control 2116 may compare lineage information from two or more dates. The user may select a first date. The first date may be date 2106. The user may select a second date. The date may be date 2118.

Control 2116 may allow the user to compare lineage information as it existed on date 2106 with lineage as it existed on date 2118. The changes to lineage information may be presented to the user.

Figure 22:
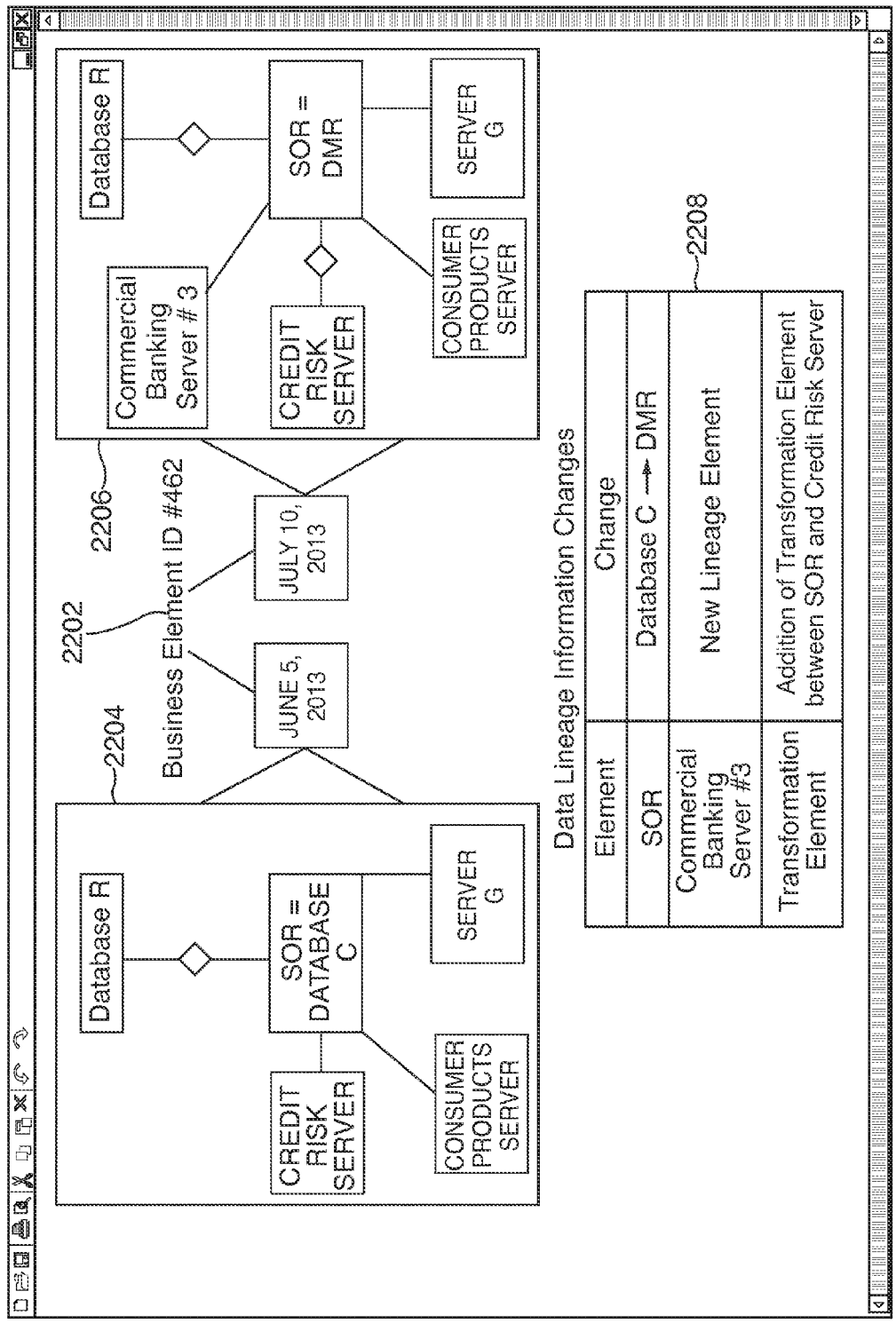
FIG. 22 shows yet other illustrative information in accordance with the principles of the invention.

FIG. 22 shows illustrative GUI 2200. GUI 2200 may display changes to data lineage information.

GUI 2200 may display data lineage information change. The data lineage information change may correspond to a business element. The business element may be associated with identifier 2202.

GUI 2200 may include data lineage information 2204. Data lineage information 2204 may be data lineage information corresponding to a business element. The business element may be associated with identifier 2202. Data lineage information 2204 may be data lineage information as it existed on a first calendar date.

GUI 2200 may include data lineage information 2206. Data lineage information 2206 may be data lineage information corresponding to a business element. The business element may be associated with identifier 2202. Data lineage information 2206 may be data lineage information as it existed on a second calendar date.

GUI 2200 may include changes 2208. Changes 2208 may display one or more data lineage information changes. The data lineage information changes may be changes between a first date and a second date.

Figure 23:
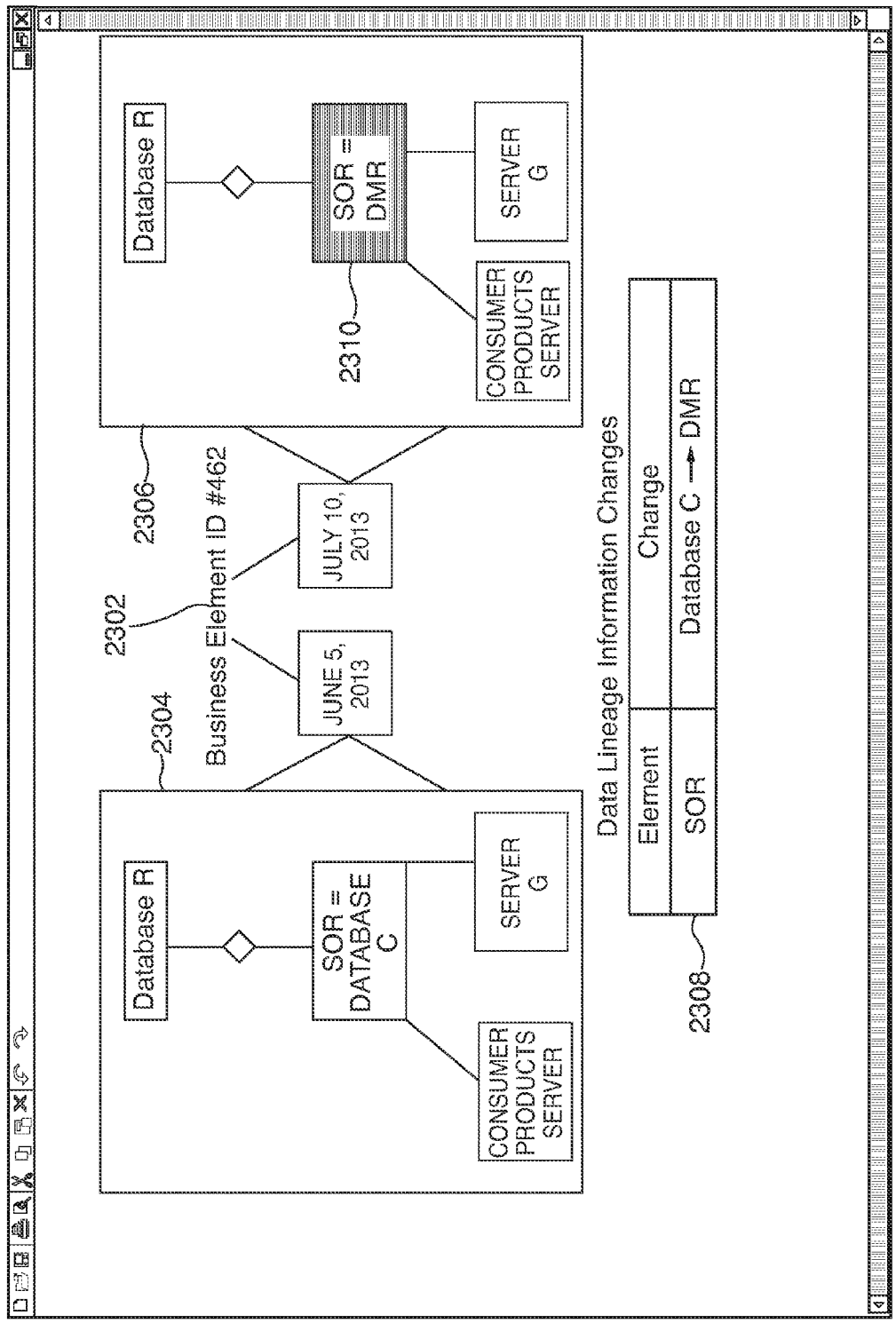
FIG. 23 shows yet other illustrative information in accordance with the principles of the invention.

FIG. 23 shows illustrative GUI 2300. GUI 2300 may display changes to data lineage information.

GUI 2300 may display data lineage information change. The data lineage information change may correspond to a business element. The business element may be associated with identifier 2302.

GUI 2300 may include data lineage information 2304. Data lineage information 2304 may be data lineage information corresponding to a business element. The business element may be associated with identifier 2302. Data lineage information 2304 may be data lineage information as it existed on a first calendar date.

GUI 2300 may include data lineage information 2306. Data lineage information 2306 may be data lineage information corresponding to a business element. The business element may be associated with identifier 2302. Data lineage information 2306 may be data lineage information as it existed on a second calendar date.

GUI 2300 may include changes 2308. Changes 2308 may display one or more data lineage information changes. The data lineage information changes may be changes between a first date and a second date.

GUI 2300 may include a visual change indicator. The visual change indicator may be any suitable indicator, such as highlighting, shading, color change or superimposed information models. Exemplary visual change indicator may be represented by indicator 2310. Indicator 2310 may visually indicate one or more data lineage information changes. Indicator 2310 may be a highlighted indicator.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage encoded media including memory storage device.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems or methods for data lineage discovery, data lineage analysis, data lineage role-based security and data lineage notification are therefore provided. Persons skilled in the art will appreciate that the present invention can be practiced by other than the described embodiments, which are presented for purposes of illustration rather than of limitation, and that the present invention is limited only by the claims that follow.

What is claimed is:

1. Apparatus for temporal data lineage analysis comprising:
   machine readable memory configured to store a plurality of technical data element identifiers ("TDEIs"), each TDEI representing technical data in a source code database;
   a receiver configured to receive:
      a query for data lineage information of a business element, the business element being selected from a group including a social security number, an address and a credit line;
   a processor configured to:
      identify two or more TDEIs corresponding to the business element;
      identify first data lineage information for a first TDEI corresponding to the business element;
      identify second data lineage information for a second TDEI corresponding to the business element;
      aggregate the first data lineage information and the second data lineage information;
      identify in the aggregated data lineage information a first graph of data lineage information corresponding to a first date, the first graph comprising:
         a visual indicator showing a system location for technical data represented by the first TDEI on the first date and a system location for the technical data represented by the second TDEI on the first date;
         a visual indicator showing a previous system location for the technical data represented by the first TDEI and a previous system location for the technical data represented by the second TDEI; and
         a visual indicator showing a movement between system locations for the technical data represented by the first TDEI and a movement between system locations for the technical data represented by the second TDEI; and
      identify in the aggregated data lineage information a second graph of data lineage information corresponding to a second date, the second graph comprising:
         a visual indicator showing a system location for technical data represented by the first TDEI on the second date and a system location for the technical data represented by the second TDEI on the second date;
         a visual indicator showing a previous system location for the technical data represented by the first TDEI and a previous system location for the technical data represented by the second TDEI; and
         a visual indicator showing a movement between system locations for the technical data represented by the first TDEI and a movement between system locations for the technical data represented by the second TDEI; and
an electronic switch configured to:
toggle between the first graph of data lineage information and the second graph of data lineage information.

2. The apparatus of claim 1 wherein the TDEI is a Key Data Element identifier ("KDEI").

3. The apparatus of claim 1 wherein the data lineage information comprises historical data lineage information.

4. The apparatus of claim 1 wherein the processor is further configured to identify one or more changes in data lineage information from the first date to the second date.

5. The apparatus of claim 1 wherein the processor is further configured to:
identify one or more differences in data lineage information from the first graph to the second graph; and
track the data lineage differences across time.

6. The apparatus of claim 1 further comprising:
the processor further configured to retrieve a third graph of data lineage information corresponding to a change of data lineage information from the first date to the second date.

7. The apparatus of claim 1 further comprising:
the processor further configured to retrieve a third graph of data lineage information displaying a visual indication of a change of data lineage information from the first date to the second date.

8. The apparatus of claim 1 wherein the data lineage information change comprises a change in data lineage information of a TDEI.

9. The apparatus of claim 1 wherein the data lineage information change comprises a change in a System of Record ("SOR") of a TDEI.

10. An article of manufacture comprising a non-transitory computer usable medium having computer readable program code embodied therein, the code when executed by a processor causes a computer to perform data lineage analysis, the computer readable program code in said article of manufacture comprising:
computer readable program code for causing the computer to store:
a plurality of technical data element identifiers ("TDEIs"); and
a business element identifier corresponding to a business element;
computer readable program code for causing the computer to associate two or more TDEIs with the business element;
computer readable program code for causing the computer to receive a query for data lineage information corresponding to the business element;
computer readable program code for causing the computer to identify two or more TDEIs corresponding to the business element;
computer readable program code for causing the computer to
identify first data lineage information for a first TDEI corresponding to the business element;
identify second data lineage information for a second TDEI corresponding to the business element; and
aggregate the first data lineage information and the second data lineage information;
computer readable program code for causing the computer retrieve:
a first graph of aggregated data lineage information corresponding to a first date, the first graph comprising:
a visual indicator showing a system location for technical data represented by the first TDEI on the first date and a system location for the technical data represented by the second TDEI on the first date;
a visual indicator showing a previous system location for the technical data represented by the first TDEI and a previous system location for the technical data represented by the second TDEI; and
a visual indicator showing a movement between system locations for the technical data represented by the first TDEI and a movement between system locations for the technical data represented by the second TDEI; and
a second graph of aggregated data lineage information corresponding to a second date, the second graph comprising:
a visual indicator showing a system location for technical data represented by the first TDEI on the second date and a system location for the technical data represented by the second TDEI on the second date;
a visual indicator showing a previous system location for the technical data represented by the first TDEI and a previous system location for the technical data represented by the second TDEI; and
a visual indicator showing a movement between system locations for the technical data represented by the first TDEI and a movement between system locations for the technical data represented by the second TDEI; and
computer readable program code for causing the computer to configure an electronic switch to toggle between the first graph of data lineage information and the second graph of data lineage information.

11. The article of manufacture of claim 9 wherein the TDEI is a Key Data Element ("KDEI").

12. The article of manufacture of 10, the article further comprising:
computer readable program code for causing the computer to determine one or more changes in data lineage information from the first date to the second date.

13. The article of manufacture of claim 10, the article further comprising:
computer readable program code for causing the computer to determine one or more differences in data lineage information from the first graph to the second graph; and
computer readable code program code for causing the computer to track the data lineage differences across calendar time.

14. The article of manufacture of claim 10, the article further comprising:
computer readable program code for causing the computer to retrieve a third graph of data lineage information corresponding to a change of data lineage information from the first date to the second date.

15. The article of manufacture of claim 10, the article further comprising:
computer readable program code for causing the processor to retrieve a third graph of data lineage information; and
computer readable program code for causing the computer to display, on the third graph, a visual indication of change of data lineage information from the first date to the second date.

16. The article of manufacture of claim 10, wherein the data lineage information change comprises a change in data lineage information of a TDEI.

17. The article of manufacture of claim 16 wherein the TDEI is associated with a Technical Data Element ("TDE").

18. The article of manufacture of claim 10 wherein the data lineage information change comprises a change in a System of Record ("SOR") of a TDEI.

\* \* \* \* \*